United States Patent
Probst et al.

(10) Patent No.: US 8,984,871 B1
(45) Date of Patent: Mar. 24, 2015

(54) TRANSMISSION ASSEMBLY

(75) Inventors: Jesse L. Probst, Stratsburg, IL (US); Eric S. Phanco, Decatur, IL (US); Tyler J. Hermann, Sullivan, IL (US); Joseph P. Niemerg, Dieterich, IL (US); Shane A. Deters, Mattoon, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 660 days.

(21) Appl. No.: 13/336,321

(22) Filed: Dec. 23, 2011

Related U.S. Application Data

(60) Provisional application No. 61/427,002, filed on Dec. 23, 2010.

(51) Int. Cl.
*F16D 31/02* (2006.01)
*F01B 13/04* (2006.01)
*F01B 31/14* (2006.01)

(52) U.S. Cl.
USPC .................................. 60/387; 92/12.2; 92/13

(58) Field of Classification Search
USPC .................................................. 60/387, 389
See application file for complete search history.

(56) References Cited

U.S. PATENT DOCUMENTS

| | | | |
|---|---|---|---|
| 1,458,820 A | 6/1923 | Griffith | |
| 2,083,766 A | 7/1935 | Wittkopp | |
| 2,151,415 A | 3/1939 | Bennetch | |
| 2,686,998 A | 8/1954 | Miller et al. | |
| 3,156,302 A | 11/1964 | Jordan | |
| 3,159,041 A | 12/1964 | Firth et al. | |
| 3,171,288 A | 3/1965 | Firth et al. | |
| 3,309,870 A | 3/1967 | Pinkerton | |
| 3,605,565 A | 9/1971 | Berezinski | |
| 4,832,659 A | 5/1989 | Nelson | |
| 4,974,888 A | 12/1990 | Childers | |
| 5,314,387 A | 5/1994 | Hauser et al. | |
| 5,555,727 A | 9/1996 | Hauser et al. | |
| 6,131,316 A | 10/2000 | Yoshina et al. | |
| 6,322,282 B1 | 11/2001 | Kussman et al. | |
| 6,530,855 B1 | 3/2003 | Folsom et al. | |
| 6,579,072 B2 | 6/2003 | Trousil et al. | |
| 6,651,529 B1 | 11/2003 | Poplawsli et al. | |
| 6,983,815 B2 | 1/2006 | Abend et al. | |
| 7,111,457 B1 | 9/2006 | Langenfeld et al. | |
| 7,396,183 B2 | 7/2008 | Contero et al. | |
| 7,708,531 B2 | 5/2010 | Sakikawa et al. | |
| 7,866,152 B2 | 1/2011 | Iida | |
| 2009/0178401 A1* | 7/2009 | Kline et al. | 60/487 |
| 2011/0192158 A1 | 8/2011 | Simon | |

* cited by examiner

*Primary Examiner* — Edward Look
*Assistant Examiner* — Daniel Collins
(74) *Attorney, Agent, or Firm* — Neal, Gerber & Eisenberg LLP

(57) ABSTRACT

A hydraulic drive device having a pump and motor is disclosed, where the pump swash plate includes a pair of structural ribs and the housing has a pair of thrust ribs on an inner surface. Only one thrust rib is in contact with one of the structural ribs at a time, to permit arcuate rotation of the swash plate while limiting axial movement of the swash plate. The axes of rotation of the swash plate trunnion, input shaft and output shaft are in a common plane. A rotary bypass shaft for engaging transmission check plugs includes an external bypass arm. A pair of detents are externally formed on the housing, and the bypass arm includes separate pairs of openings to engage the pair of detents when the bypass arm is in different positions.

22 Claims, 21 Drawing Sheets

TRANSMISSION ASSEMBLY

BACKGROUND OF THE INVENTION

This implication claims the benefit of U.S. Provisional Application No. 61/427,002 filed on Dec. 23, 2010, which is incorporated by reference in its entirety.

This application relates to hydrostatic transmissions generally and, in particular, to transmissions intended for use in driving a vehicle or other apparatus, such as a walk-behind leaf blower, snow thrower, brush cutter or various types of lawn mower.

SUMMARY OF THE INVENTION

An improved transmission assembly is disclosed herein, as described in more detail below. The transmission assembly may be mounted on a vehicle or other powered machine or apparatus, such as a leaf blower or lawn mower, for example, in various orientations to accommodate a variety of vehicle or equipment configurations.

A better understanding of the objects, advantages features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
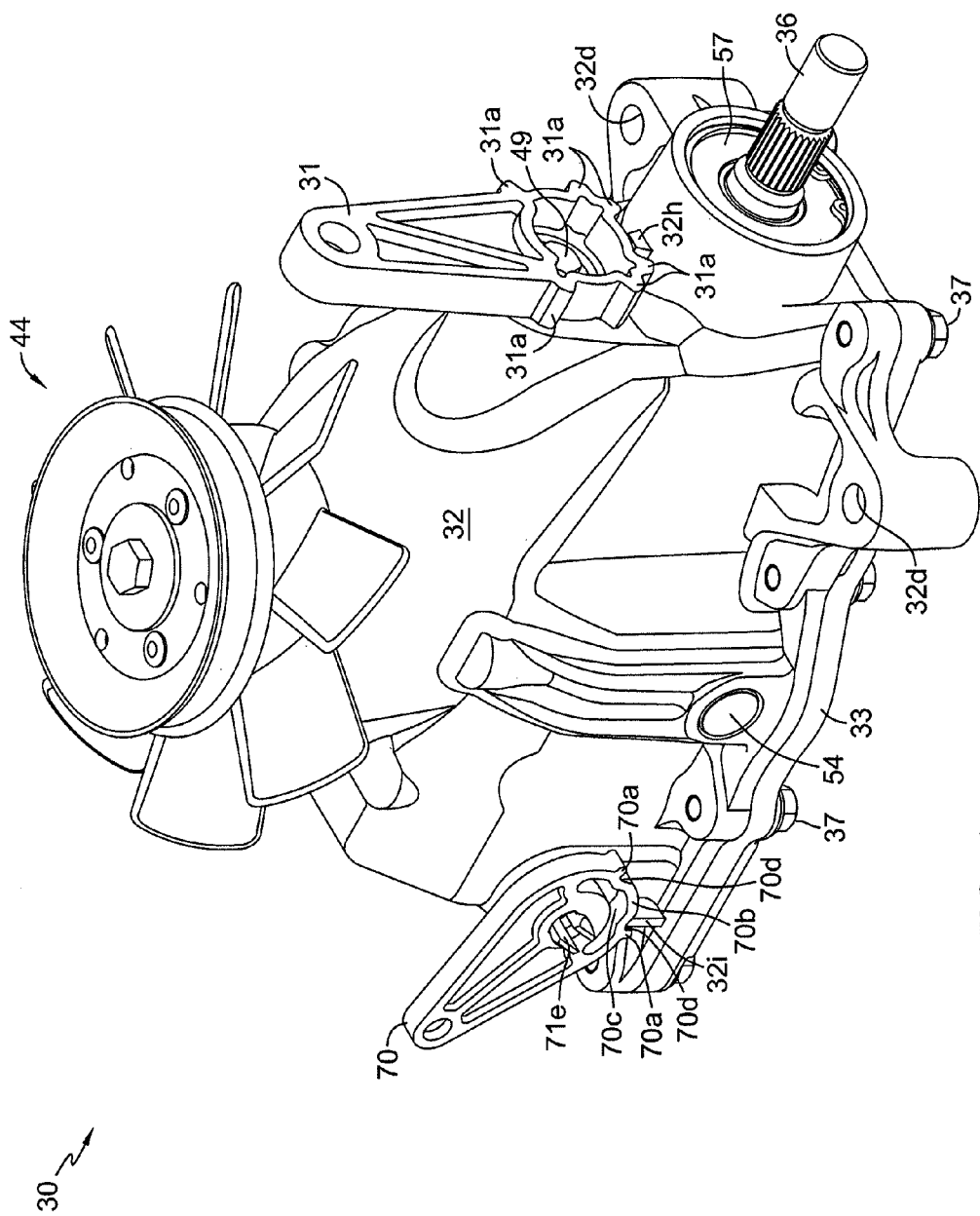
FIG. 1 is a perspective view of a transmission assembly in accordance with the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. As stated above, the present specification is intended to be taken as a whole and interpreted in accordance with the principles of the present invention as taught herein and understood by one of ordinary skill in the art.

Referring to FIGS. 1-13, variable speed hydrostatic transmission assembly 30 generally comprises an input shaft 35 driving an axial piston pump assembly 40 rotatably disposed on a pump running surface 38a of a center section 38, the center section comprising hydraulic fluid ports and passages to hydraulically drive an axial piston motor assembly 42, the motor assembly 42 rotatably disposed on a motor running surface 38b of the center section 38 and driving an output shaft 36. The design of the axial piston pump and motor assemblies of transmission assembly 30, comprising pistons disposed in a rotatable cylinder block, are well-known in the art and will not be described in detail herein.

Hydrostatic transmissions of this type are described generally in, e.g., commonly-owned U.S. Pat. No. 5,314,387. A hydrostatic transaxle design used in a snow thrower is shown in commonly-owned U.S. Pat. No. 6,651,529. The terms of both of these patents are incorporated herein by reference.

The illustrated embodiment of transmission assembly 30 is a sealed unit which may be oriented in any position, depending on the vehicle or equipment configuration to which it is applied. However, for the purposes of this description, position and orientation terms such as top, bottom, upper, lower, vertical, horizontal, etc., will be applied to transmission assembly 30 as shown in FIG. 8 unless otherwise stated herein.

Figure 4:
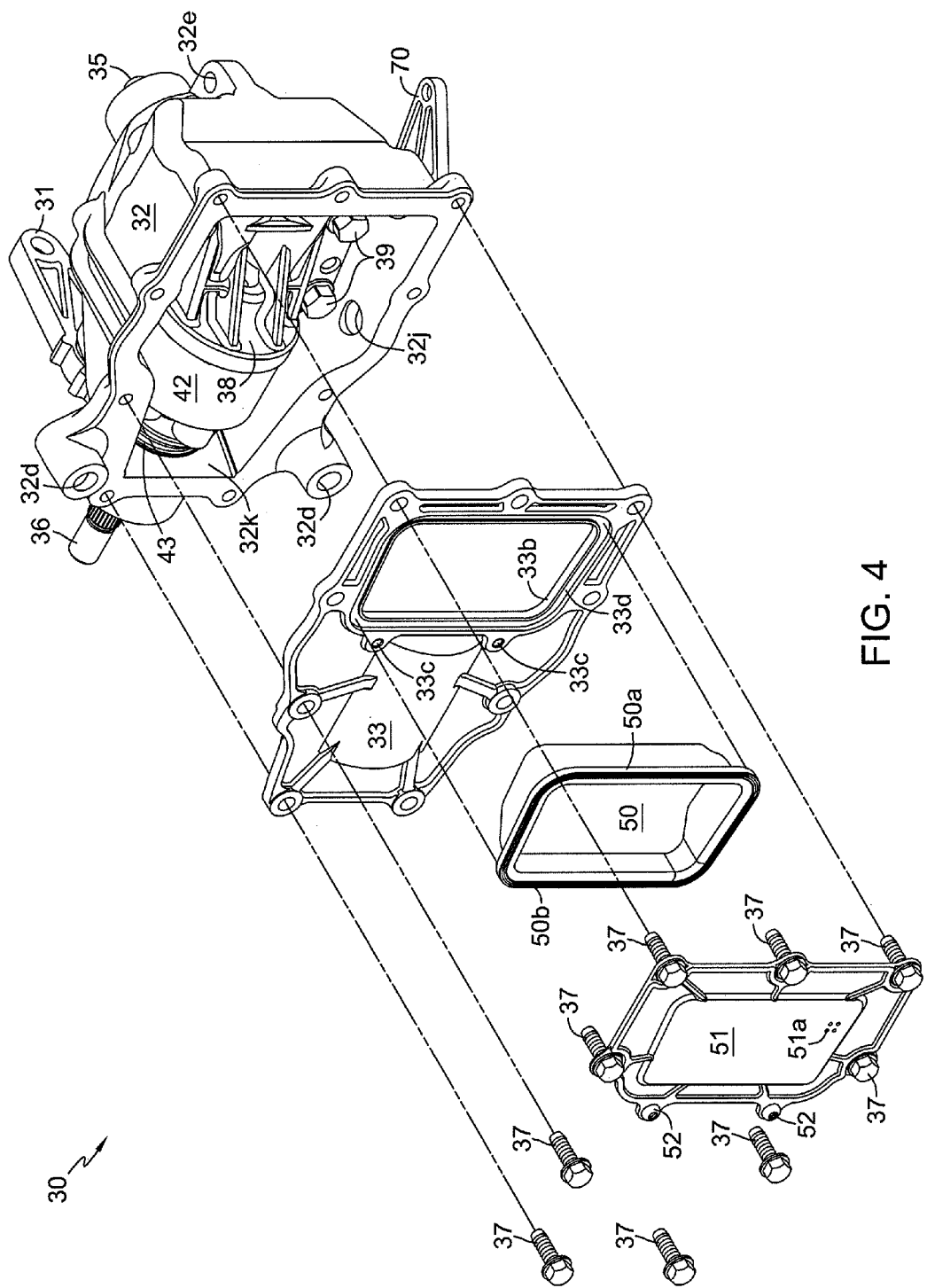
FIG. 4 is a partially exploded perspective view of the transmission assembly of FIG. 2.
Figure 8:
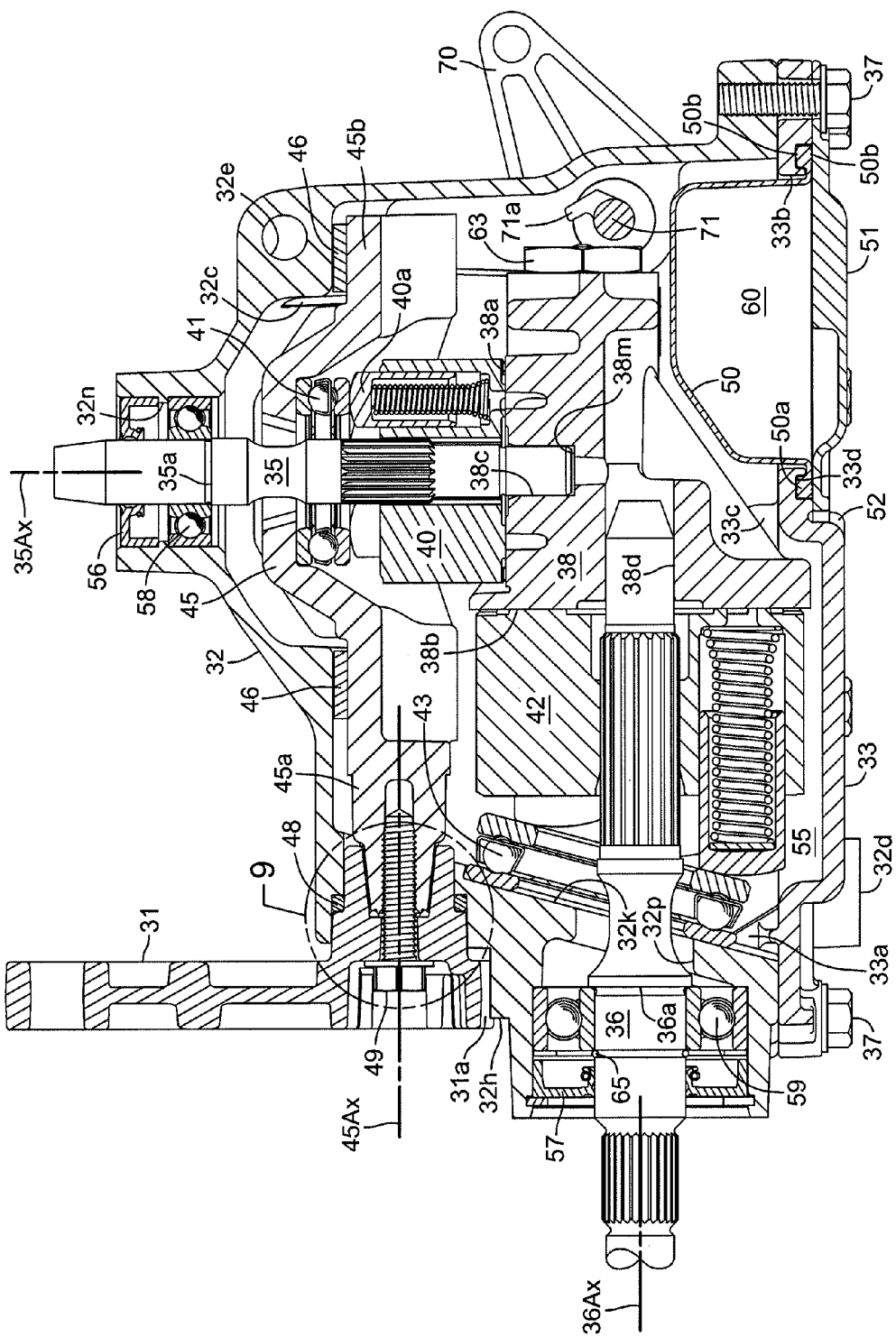
FIG. 8 is a cross-sectional view of the transmission assembly of FIG. 7 along line 8-8.
Figure 9:
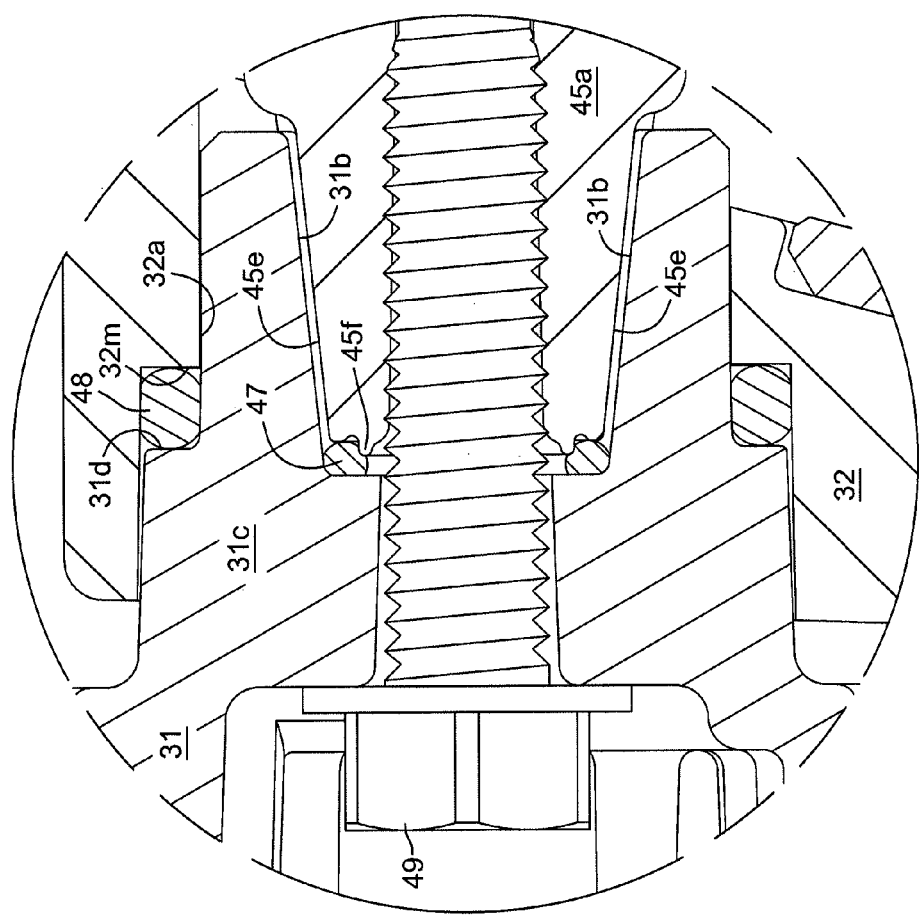
FIG. 9 is an enlarged detail view of the sealing interface between the swash plate trunnion shaft and the control arm as indicated by circle 9 of FIG. 8.
Figure 10:
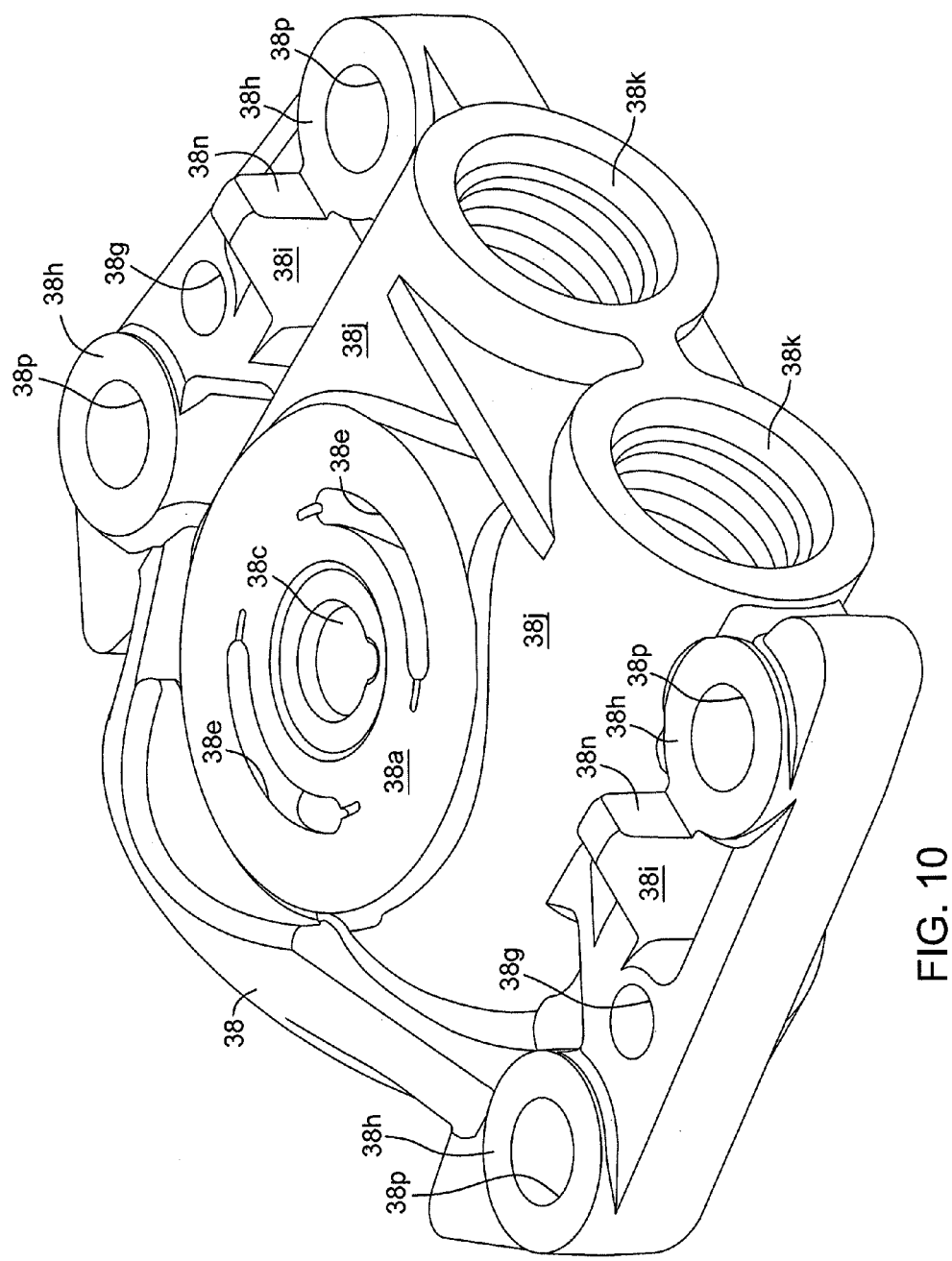
FIG. 10 is a perspective view of the center section of the transmission assembly of FIG. 1.
Figure 11:
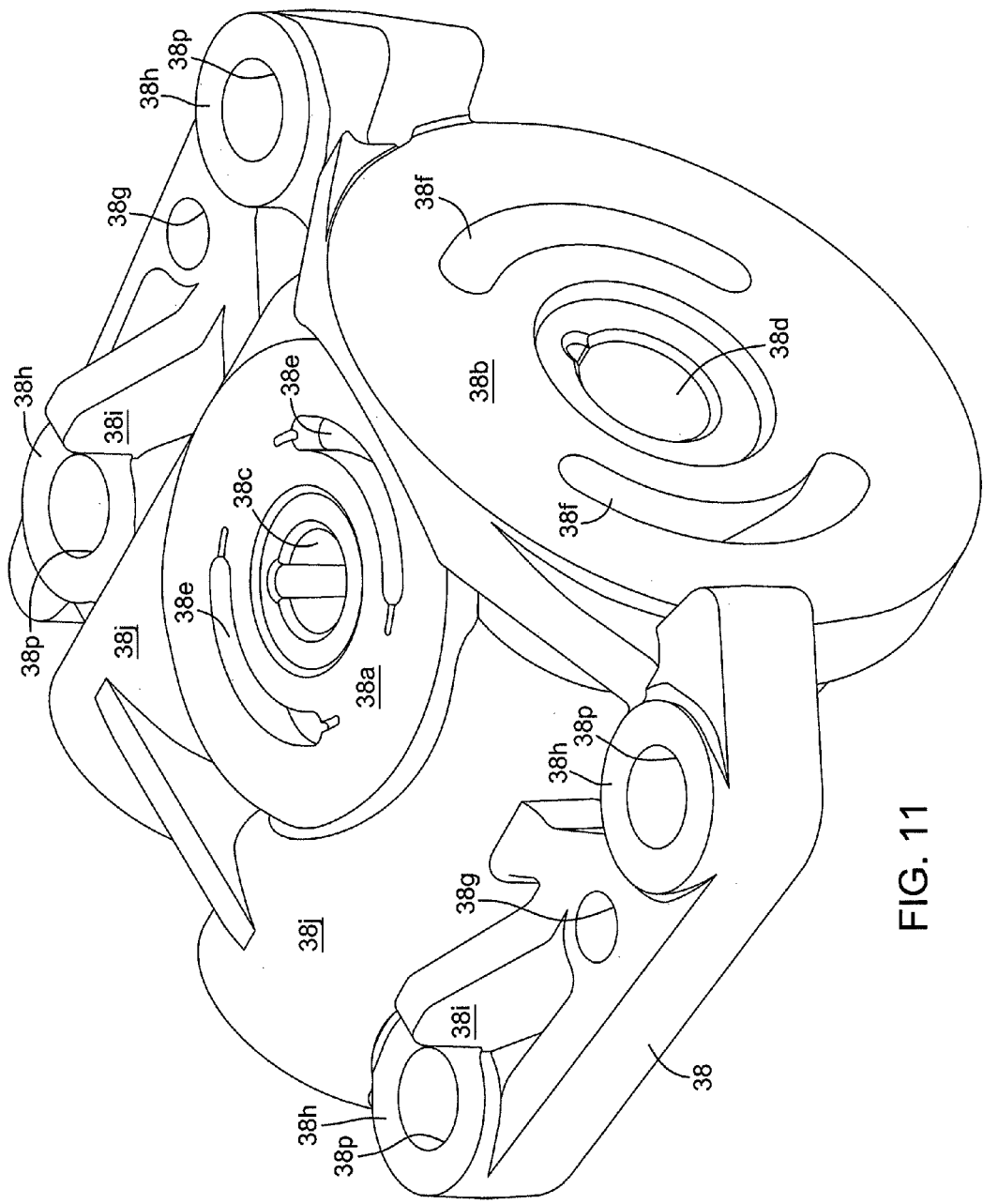
FIG. 11 is a perspective view of the center section of FIG. 10 rotated 180 degrees about the input shaft axis.
Figure 12:
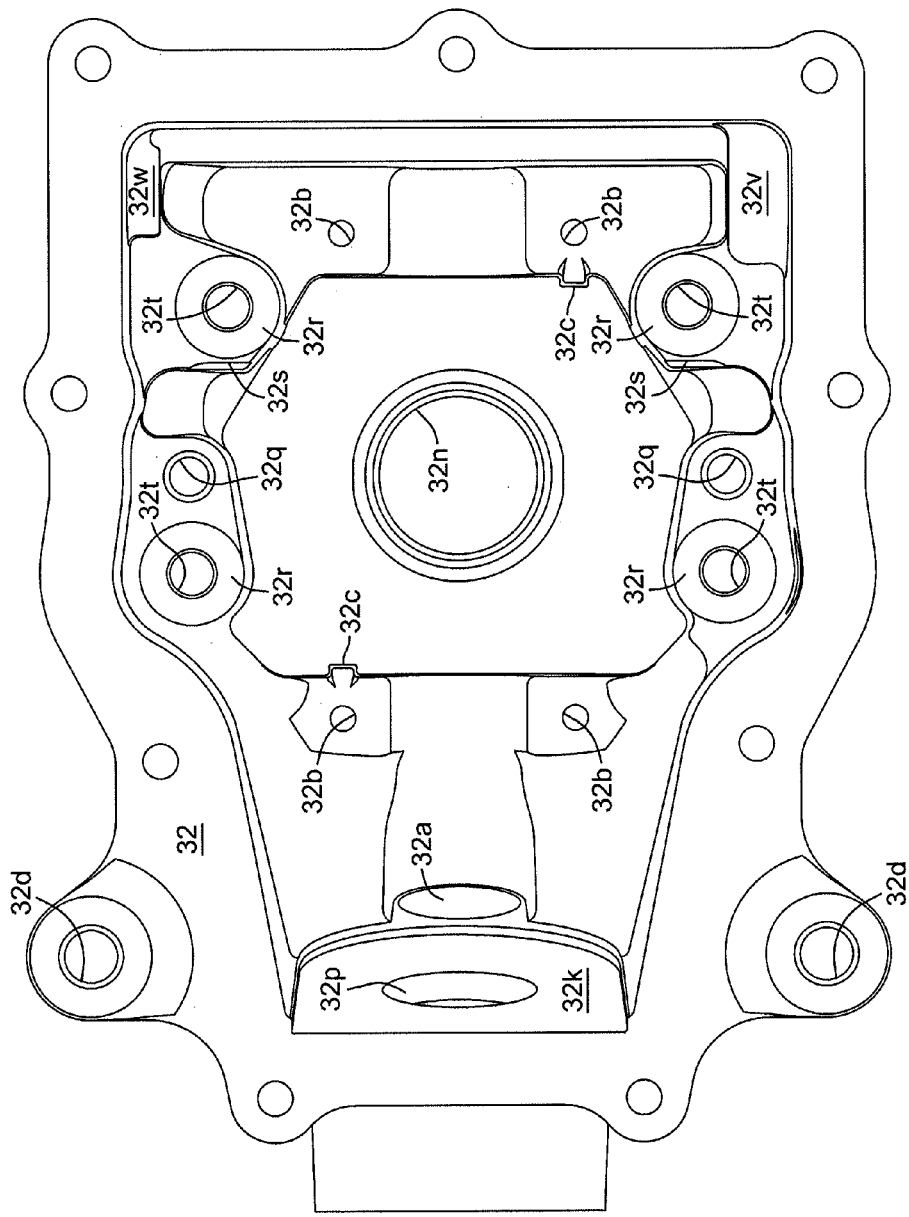
FIG. 12 is a bottom plan view of the main housing of the transmission assembly of FIG. 1.

Referring to FIGS. 4 and 8, transmission assembly 30 comprises internal sump 55 formed primarily by joining and sealing a main housing 32 and a housing cover plate 33 along a horizontal split line by means of a plurality of screws 37 (or other suitable fasteners) and known sealing methods, such as an adhesive-sealant or a gasket. Installation of an internal sump fluid expansion bladder 50 with bladder cover plate 51 further serves to form sump 55, as does the installation of various shaft seals such as input shaft seal 56, output shaft seal 57, trunnion shaft seal 47, control arm shaft seal 48 and bypass shaft seal 72. Bladder cover plate 51 includes one or more vent holes 51a to allow air to flow in and out of the pocket 60, formed by bladder 50 and bladder cover plate 51, as the fluid in sump 55 expands and contracts during the operating cycle of transmission assembly 30. An optional open cell structure foam block (not shown) may be installed in pocket 60, if needed, to help control the shape of the collapsing bladder 50 as the sump 55 fluid temperature rises.

As shown most clearly in FIGS. 4 and 8, expansion bladder 50 is inserted partially through opening 33b of cover plate 33 so that flange 50a of expansion bladder 50 fits into sealing groove 33d formed in cover plate 33 to create a seal around the perimeter of expansion bladder 50. Flange 50a is then trapped and retained when bladder cover plate 51 is installed. Both the upper and lower surfaces of flange 50a include a plurality of ribs and grooves 50b that run completely around the perimeter of sealing flange 50a to ensure sealing without the use of sealant. As shown, bladder cover plate 51 is installed with a portion of the screws 37 that are used to join housing cover plate 33 to main housing 32 and with additional screws 52 that engage sealed bosses 33c formed in housing cover plate 33.

Internal expansion bladder 50 allows expansion of sump 55 fluid within the sealed transmission assembly 30 without the need for a vent to atmosphere or an external expansion tank with associated fittings, etc., while enabling the versatility of orienting transmission assembly 30 in any operating position desired based upon the vehicle or equipment configuration to which transmission assembly 30 is to be applied. However, as is known in the art, check plugs, such as check plugs 63 of transmission assembly 30, must remain submerged in sump 55 fluid at all times during operation of transmission assembly 30. If transmission assembly 30 is installed in an orientation with the output shaft 36 pointing downward such that check plugs 63 are oriented at the upward end of the installed transmission assembly 30 (i.e., if transmission assembly 30 as shown in FIG. 8 is rotated approximately 90 degrees counterclockwise and installed in a vehicle, for example), then substantially complete filling of sump 55 with fluid and purging of air from the internal volume of transmission assembly 30 must be ensured during the manufacturing process. If it is deemed by a manufacturer of transmission assembly 30 to be impractical to reliably ensure proper fluid fill level at a cost and confidence level acceptable to that manufacturer, then modification of main housing 32 to increase the internal volume of main housing 32 and the sump 55 fluid volume in the vicinity of the check plugs 63 could be deemed desirable or necessary in order to avoid placing restrictions on the installed orientation of transmission assembly 30. Also, fluid expansion bladder 50 could be relocated to the end of main housing 32 that is proximate to check plugs 63. After sump 55 of transmission assembly 30 is properly filled with an appropriate transmission fluid, a plug 54 is installed in fluid fill opening 32j of main housing 32 to complete the formation and sealing of sump 55. Plug 54 may be a threaded plug or a push-in rubber or elastomeric plug, for example. Plug 54 may be positioned in housing 32 in a location other than that shown herein, if desired.

Figure 5:
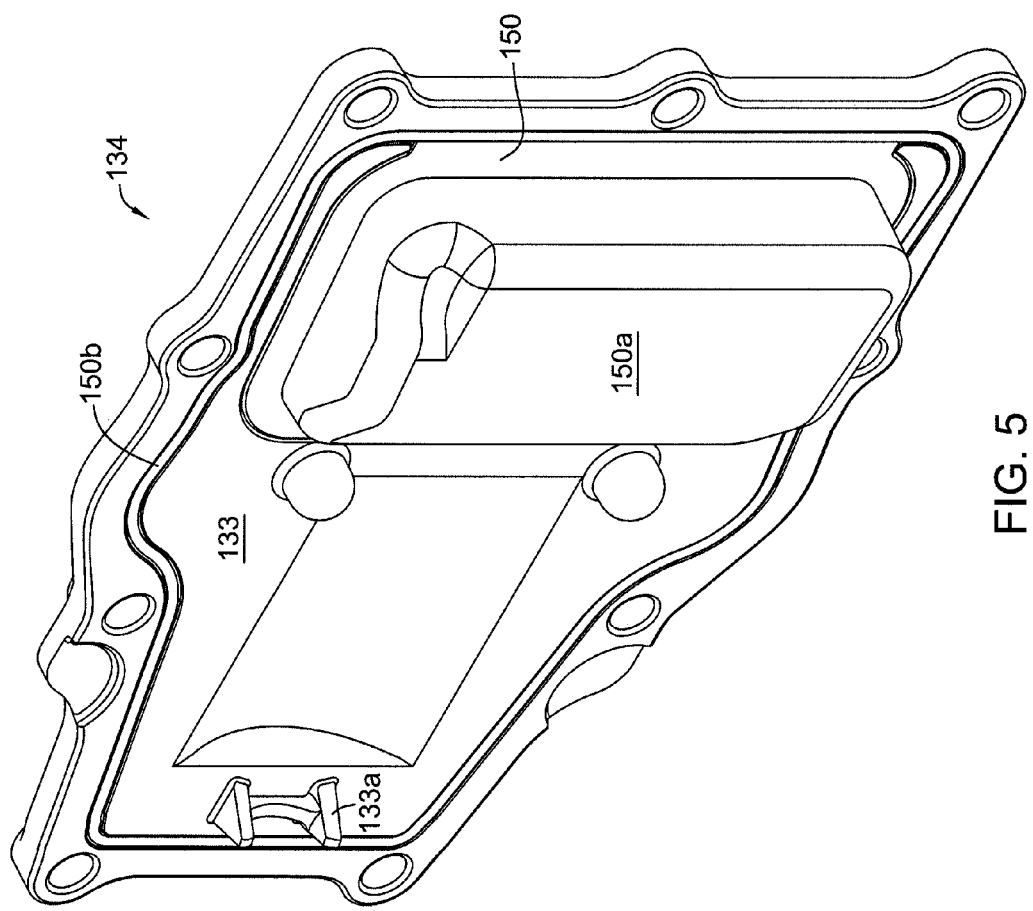
FIG. 5 is a perspective view of an alternative housing cover plate.

As an alternative, housing cover plate 134, as shown in FIG. 5, replaces housing cover plate 33 and internal expansion bladder 50 of transmission assembly 30. Housing cover plate 134 includes a plate component 133 and an integral, over-molded bladder-gasket 150 comprising an expansion bladder component 150a and a gasket component 150b. Alternatively, expansion bladder component 150a and gasket component 150b need not be over-molded onto plate component 133 at the same time or joined together as shown, but rather can be over-molded separately onto plate component 133 and may each be formed with different material properties to achieve desired flexibility, sealing characteristics, etc.

Figure 22:
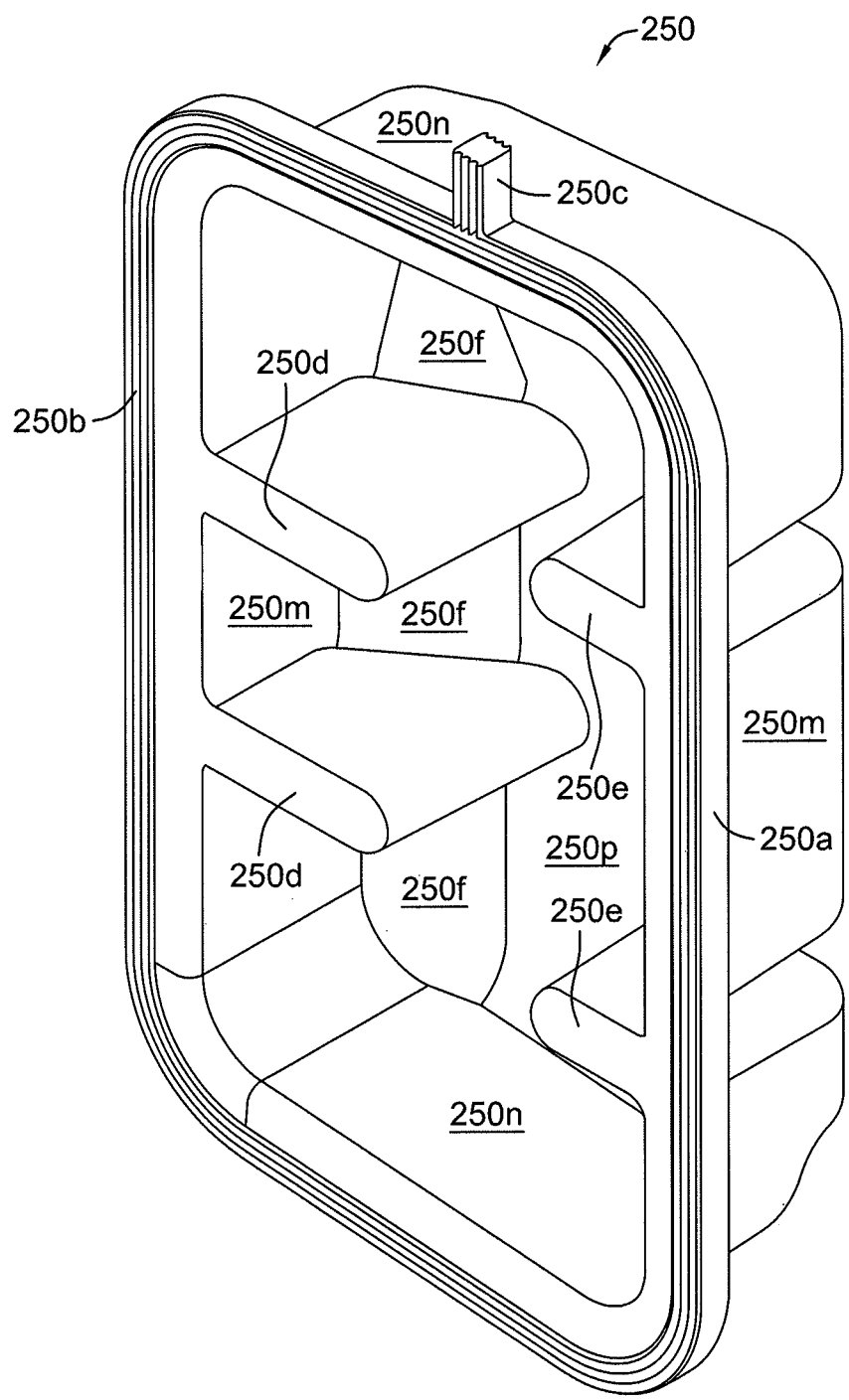
FIG. 22 is a perspective view of an alternative expansion bladder.
Figure 23:
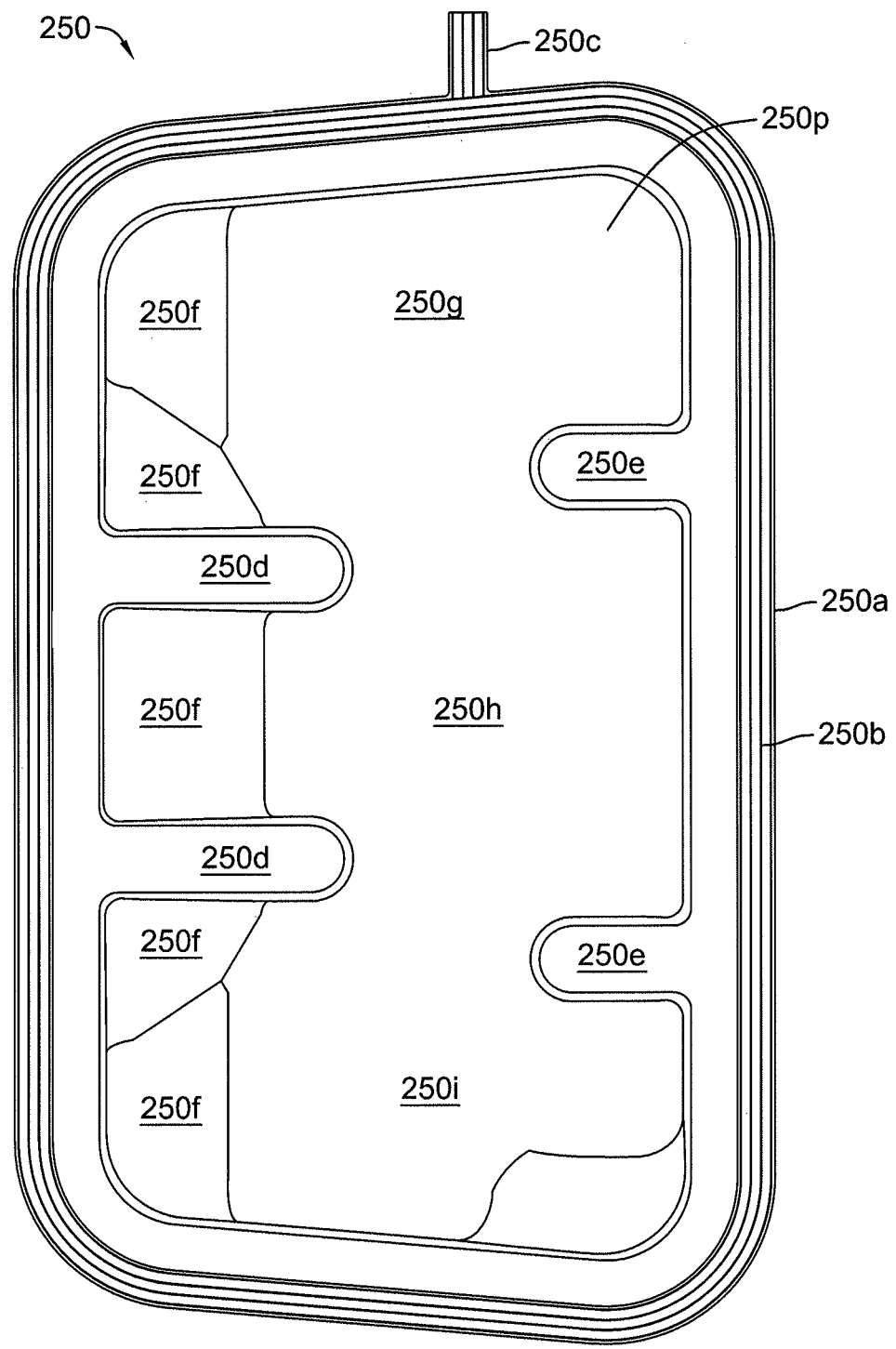
FIG. 23 is a bottom plan view of the bladder shown in FIG. 22.

Bladder 250 as shown in FIGS. 22 and 23 is an alternative design that can be used in place of bladder 50 as described above, and flange 250a operates similarly to flange 50a previously described for mounting bladder 250 to the housing. Bladder 250 has an approximately rectangular shape with two longer sidewalls 250m and two shorter sidewalls 250n adjacent to surfaces 250p and 250f to bound an internal volume, in cooperation with a plate such as bladder cover plate 51. Two pairs of stiffening ribs 250d and 250e extend into this internal volume of bladder 250 perpendicularly from longer side walls 250m, running along the respective longer sidewalls 250m from flange 250a to top surface 250p. These ribs 250d, 250e assist not only in strengthening the body of bladder 250 to prevent unwanted collapse, but also to improve its ability to collapse in a controlled manner as the oil expands. Ribs 250d are preferably longer than ribs 250e, and it has been determined that the placement of the two longer ribs 250d on one longer sidewall 250m and the other two shorter ribs 250e on the opposite longer sidewall 250m improves the ability of bladder 250 to collapse appropriately. The location of the two longer ribs 250d between the two shorter ribs 250e, as depicted in FIGS. 22 and 23, creates three separate zones 250g, 250h and 250i in the internal volume of bladder 250 for sidewalls 250m, 250n to collapse in on themselves. A beveled surface 250f is provided on one sidewall 250m primarily for clearance so that bladder 250 fits within the housing 32, but this beveled surface 250f also improves the ability of bladder 250 to collapse appropriately. Bladder 250 may be composed of various materials but is preferably a rubber compound. Tab 250c ensures proper placement of bladder 250 in a transmission assembly.

When housing cover plate 33 or alternate housing cover plate 134 is installed onto main housing 32, an integrally-formed bearing support structure 33a or integrally-formed bearing support structure 133a, respectively, cooperates with a thrust bearing positioning recess 32k formed in main housing 32 to properly position motor thrust bearing 43. It wilt be understood that housing cover plate 33 or alternate housing cover plate 143 may use protrusions (not shown) which mate with and engage openings (not shown) in main housing 32 to aid assembly by ensuring proper placement of the housing cover plate 33 or 143.

As is evident upon examination of FIGS. 4, 6, 8 and 13, transmission assembly 30 can be assembled without rotating main housing 32 about more than one axis during assembly. All mechanical components of transmission assembly 30 can be assembled into main housing 32 prior to attaching housing cover plate 33. All mechanical components and, in particular, all rotating shaft bearings and/or bearing surfaces are located within main housing 32. This design and arrangement of all rotating components within or at least partially supported by a single housing component allows all critical housing machining to occur within only one housing component (main housing 32) so that critical alignment of bearing surfaces located in separate housing components is not required in the manufacture of transmission assembly 30.

Referring primarily to FIGS. 1, 3, 6, 8, 9 and 12, the speed and direction of the output shaft 36 of transmission assembly 30 is controlled by rotating a control arm 31 engaged to trunnion shaft 45a of trunnion-mounted swash plate 45 to move swash plate 45 in an arcuate manner along the axis of rotation of trunnion shaft 45a. Swash plate 45 is engaged to pump pistons 40a in a known manner. The allowed rotation angle of control arm 31 is limited by contact between stops 31a formed on control arm 31 with protrusion 32h formed on main housing 32. In the illustrated embodiment, three pairs of stops 31a are positioned on control arm 31 such that control arm 31 can be attached in one of three orientations to trunnion shaft 45a, as permitted by the arrangement of stops 31a and the engagement of four tapered ribs 31b, formed on shaft 31c of control arm 31, with four tapered recesses 45e formed on a distal end of trunnion shaft 45a. As shown most clearly in FIG. 6, recesses 45e and ribs 31b are generally rectangular in shape.

In order to install swash plate 45, swash plate 45 is tilted and then moved into position inside housing 32 so that trunnion shaft 45a enters bore 32a as swash plate 45 is placed against cradle bearings 46 and is also positioned between the two locating thrust ribs 32c formed in housing 32. Then, control arm 31 can be oriented to the desired mounting position and installed, along with seal 47 and seal 48, by means of screw 49. Control arm 31 can have one or more leak indicator grooves (not shown) to aid assembly by ensuring proper installation of seal 47 and seal 48. As screw 49 is tightened, ribs 31b engage recesses 45e and a concentric ridge 45f formed on the end of trunnion shaft 45a is pressed against trunnion shaft seal 47 while the control arm shaft seal 48 is trapped between shoulder 31d formed on control arm shaft 31c and shoulder 32m formed on main housing 32. Control arm shaft seal 48 may be omitted and a press-fit lip-seal (not shown) can be used in lieu thereof.

Figure 19:
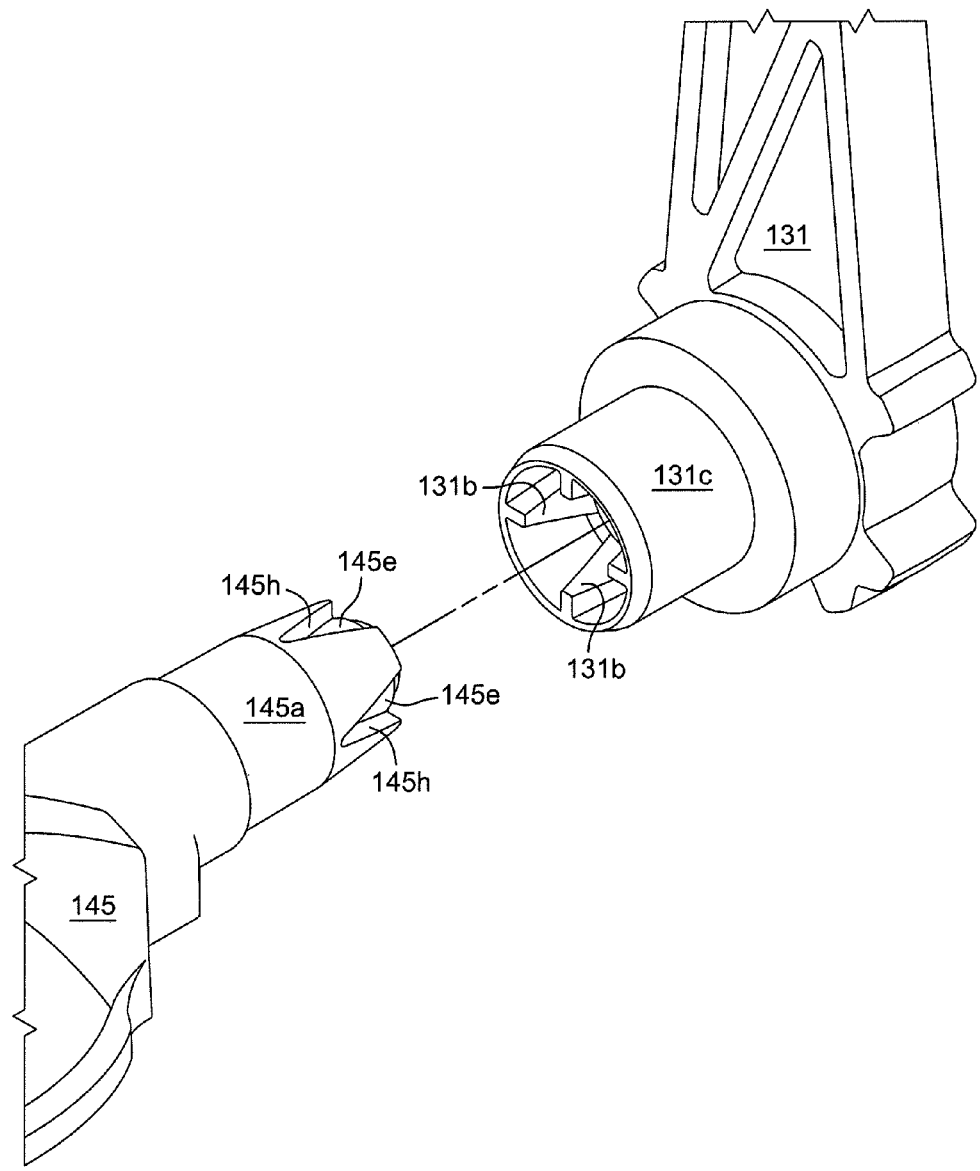
FIG. 19 is a partial, exploded perspective view of an alternative trunnion shaft and control arm assembly.
Figure 20:
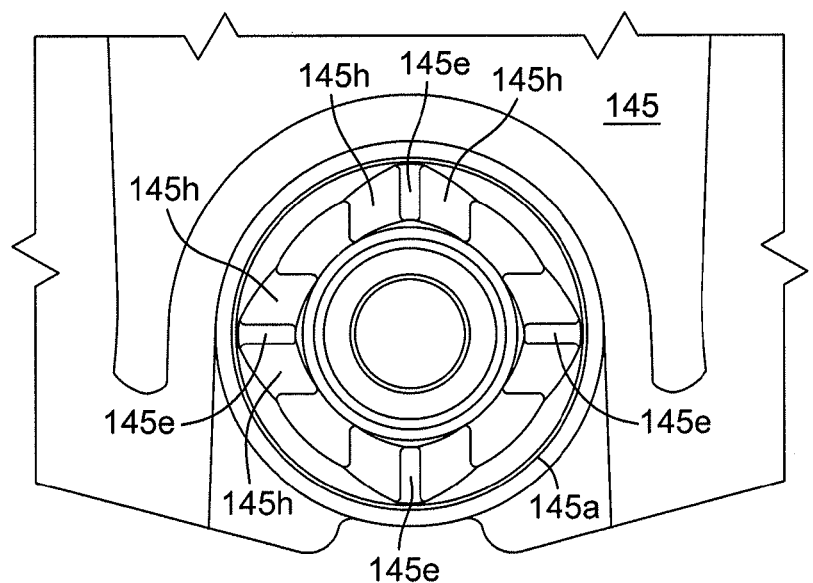
FIG. 20 is a partial, side plan view of the trunnion shaft shown in FIG. 19.
Figure 21:
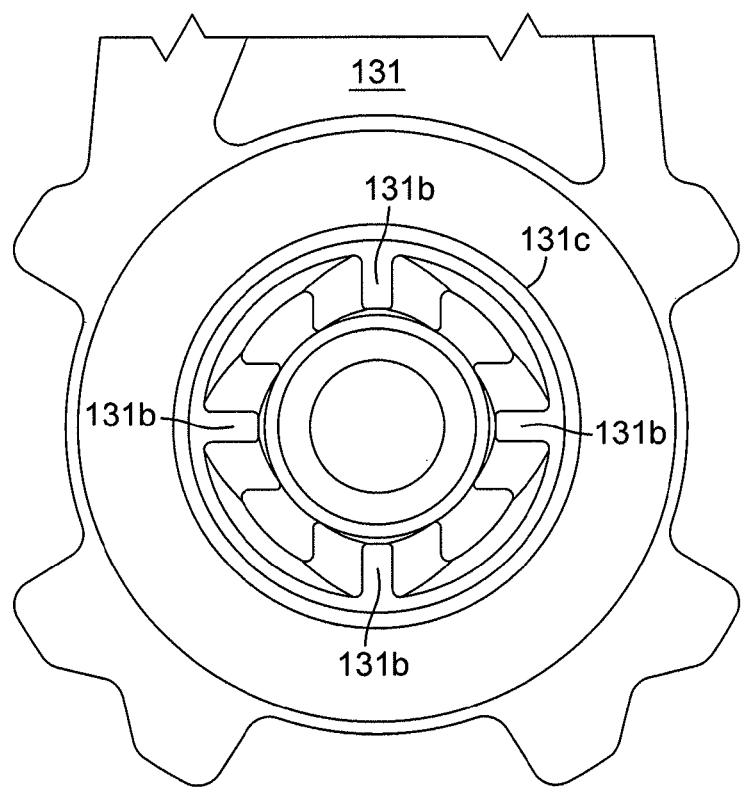
FIG. 21 is a partial side plan view of the control arm shown in FIG. 19.

FIGS. 19, 20, and 21 slow a portion of an alternative trunnion shaft and control arm assembly. Trunnion shaft 145a has a plurality of tapered recesses 145e formed about its circumference, and which engage tapered ribs 131b of control arm shaft 131c. In this embodiment, recesses 145e have a pair of side walls 145h which meet so that tapered recesses 145e are generally triangular in shape; similarly, tapered ribs 131b each have a similar shape to fit within each tapered recess 145e. The shapes and relationships of tapered recesses 145e and tapered ribs 131b as shown balance calculated force vectors to minimize the creation of radial force by trunnion shaft 145a in the vicinity of tapered recesses 145e. Tapered recesses 145e, along with tapered ribs 131b, can be clocked (e.g. by 45°) to aid assembly by facilitating installation of swash plate 145 into main housing 32. It should be understood that various features of the alternative embodiments of components described herein that do not cooperate with or affect the essential operation of one another can be used together or separately. For example, swash plate 145 and control arm 131 can be used with rotary bypass mechanism 69 and, likewise, swash plate 45 and control arm 31 can be used with bypass arm 170 and bypass shaft 171, described below.

Specialized cradle bearings 46 comprising integrally-formed locator pins 46a that engage pin receptacles 32b formed in main housing 32, are supportively positioned above trunnion shaft 45a and trunnion protrusion 45b to allow arcuate movement of swash plate 45. Swash plate 45 is further supported by the spring forces applied by pump assembly 40 against pump thrust bearing 41 that is installed in a positioning recess formed in swash plate 45, as shown in FIG. 8. Swash plate 45 is further supported through its previously described attachment to control arm shaft 31c that is integrally formed as part of control arm 31 and is rotatably supported in bore 32a formed in main housing 32. Excessive axial movement of swash plate 45 is prevented by its location between two thrust ribs 32c that each interface with a cam-like surface 45g that is formed with a curvature to interface with the drafted surface of each rib 32c as swash plate 45 is arcurately moved through its full range of motion. These interfacing surfaces are formed such that the interface of a cam-like surface 45g with a corresponding drafted surface of a rib 32c does not cause any significant axial movement of swash plate 45. The two thrust ribs 32c are spaced apart such that only one rib 32c can be in contact with one cam-like surface 45g at any given time, thereby allowing free arcuate movement of swash plate 45 while limiting the axial movement of swash plate 45. While two ribs 32c are depicted, it will be appreciated by those skilled in the art that four ribs could be used such that only two of such ribs can be in contact with one cam-like surface 45g at any given time.

Figure 3:
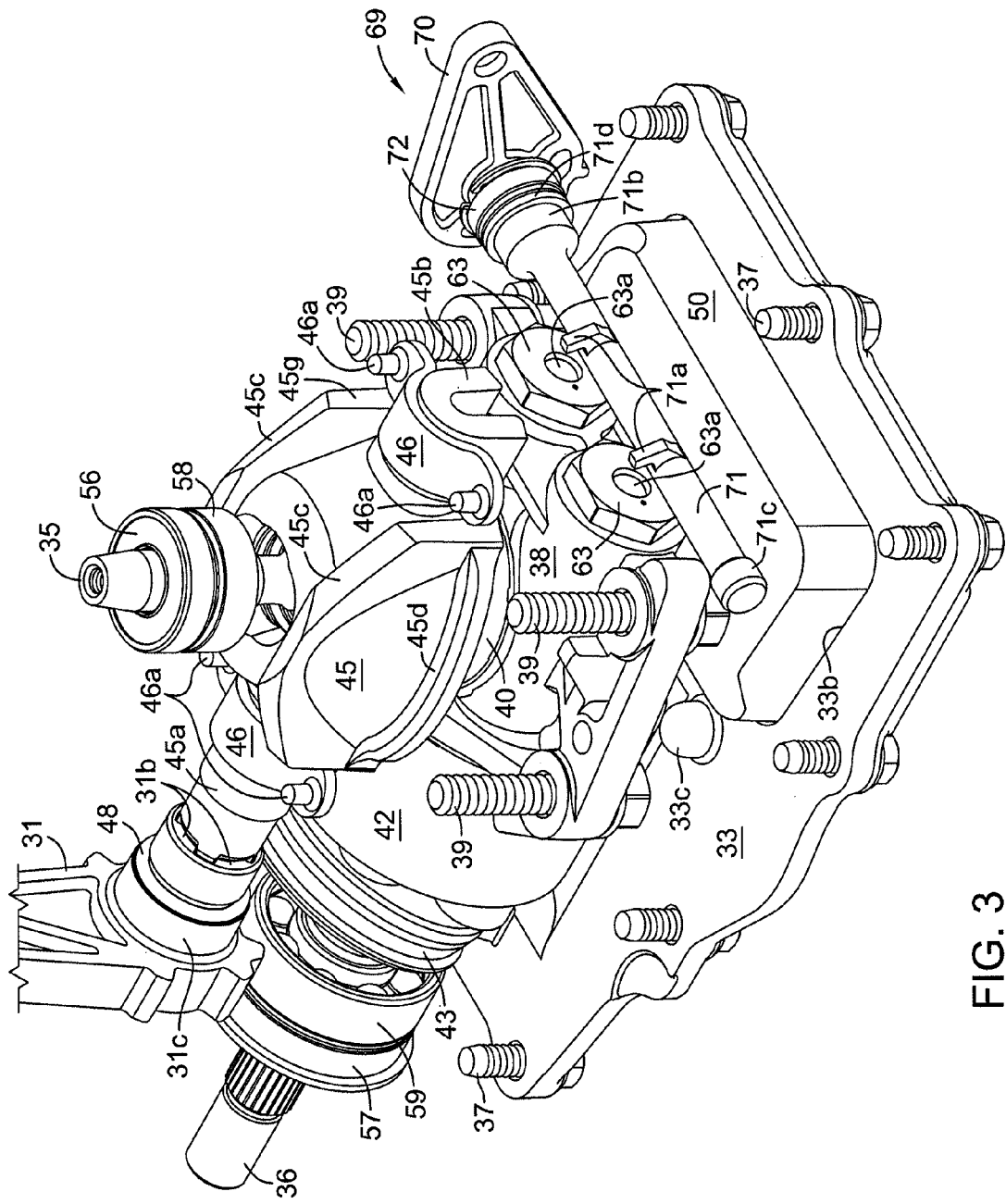
FIG. 3 is a perspective view of the transmission assembly of FIG. 2 with the main housing removed.

Positioning of specialized cradle bearings 46 on the trunnion shaft 45a and trunnion protrusion 45b allows structural arch ribs 45c and structural skirting ribs 45d to be integrally formed on the symmetrical swash plate 45 so that it is strengthened to a level that enables fabrication of swash plate 45 as an as-cast component with no machining requirement prior to installation in transmission assembly 30. As seen in FIG. 3, skirting ribs 45d extend in a direction generally perpendicular (e.g., within about 15°) to the direction of arch ribs 45c.

Referring primarily to FIGS. 1, 3, 6, 8 and 10, a rotary bypass mechanism 69 comprising a bypass arm 70 and a bypass shaft 71 is provided to allow a vehicle or equipment operator to selectively disconnect the hydraulic fluid circuit of transmission assembly 30 by unseating the check balls 63a of check plugs 63 that are installed in ports 38k formed in the ends of fluid passage tubes 38j of center section 38. If hydraulic pressure alone is used to bias the check balls 63a to the seated position shown in FIG. 3, the longitudinal axis of check plugs 63 should be horizontal so that gravity will not unseat check balls 63a. Check plugs of the type shown and described herein are also known as check valves and well known in the art and will not be described in greater detail herein.

Bypass arm 70, which can be composed of a plastic material, comprises two stops 70a, each serving as a boundary at opposite ends of a flexible arch 70b that is formed adjacent to a material void or opening 70c formed in bypass arm 70, with the material void or opening 70c allowing arch 70b to flex as will be further described. Bypass arm 70 also includes two recesses 70d, with one recess 70d located at each end of the flexible arch 70b and therefore adjacent to each of the two stops 70a. This arrangement of features provides a detent function at each end of flexible arch 70b. When bypass arm 70 is positioned in a first detent position, as shown most clearly in FIGS. 1 and 3, fingers 71a formed on shaft 71 are not in contact with the check balls 63a of check plugs 63. As the bypass arm is pivoted, flexible arch 70b wipes against projection 32i formed on housing 32, providing rotational resistance of shaft 71. When this rotational resistance is overcome, bypass arm 70 is rotated to a second detent position in which the two fingers 71a formed on shaft 71 simultaneously unseat the two check balls 63a of the two check plugs 63. In each of the two detent positions, projection 32i is seated in a recess 70d. This configuration enables the use of a very simple push-pull linkage or cable mechanism, or even rotation of bypass arm 70 by hand (if bypass arm 70 is easily accessible and its rotational resistance is not too great) to engage and disengage the bypass function.

Figure 6:
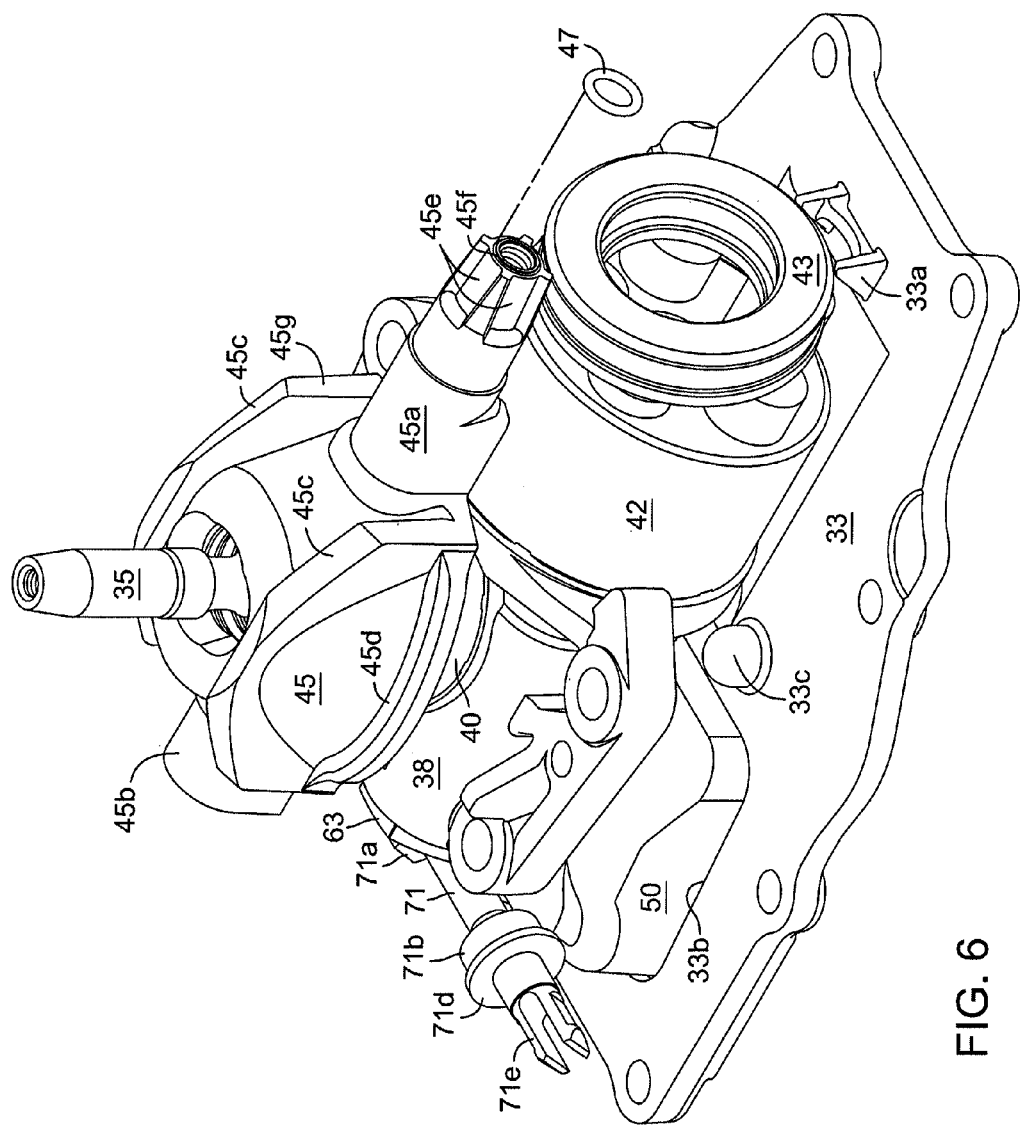
FIG. 6 is a perspective view of the transmission assembly of FIG. 1 with the main housing and various other components removed for clarity.

As can be seen in FIGS. 1 and 6, the bypass arm 70 can be easily installed onto bypass shaft 71 by pressing it into position so that it is retained on shaft 71 by a snap fit end 71c formed on shaft 71. Similarly, bypass arm 70 can be removed from bypass shaft 71 by pinching the snap fit end 71e while pulling the bypass arm away from main housing 32 along the rotational axis of bypass shaft 71.

Figure 13:
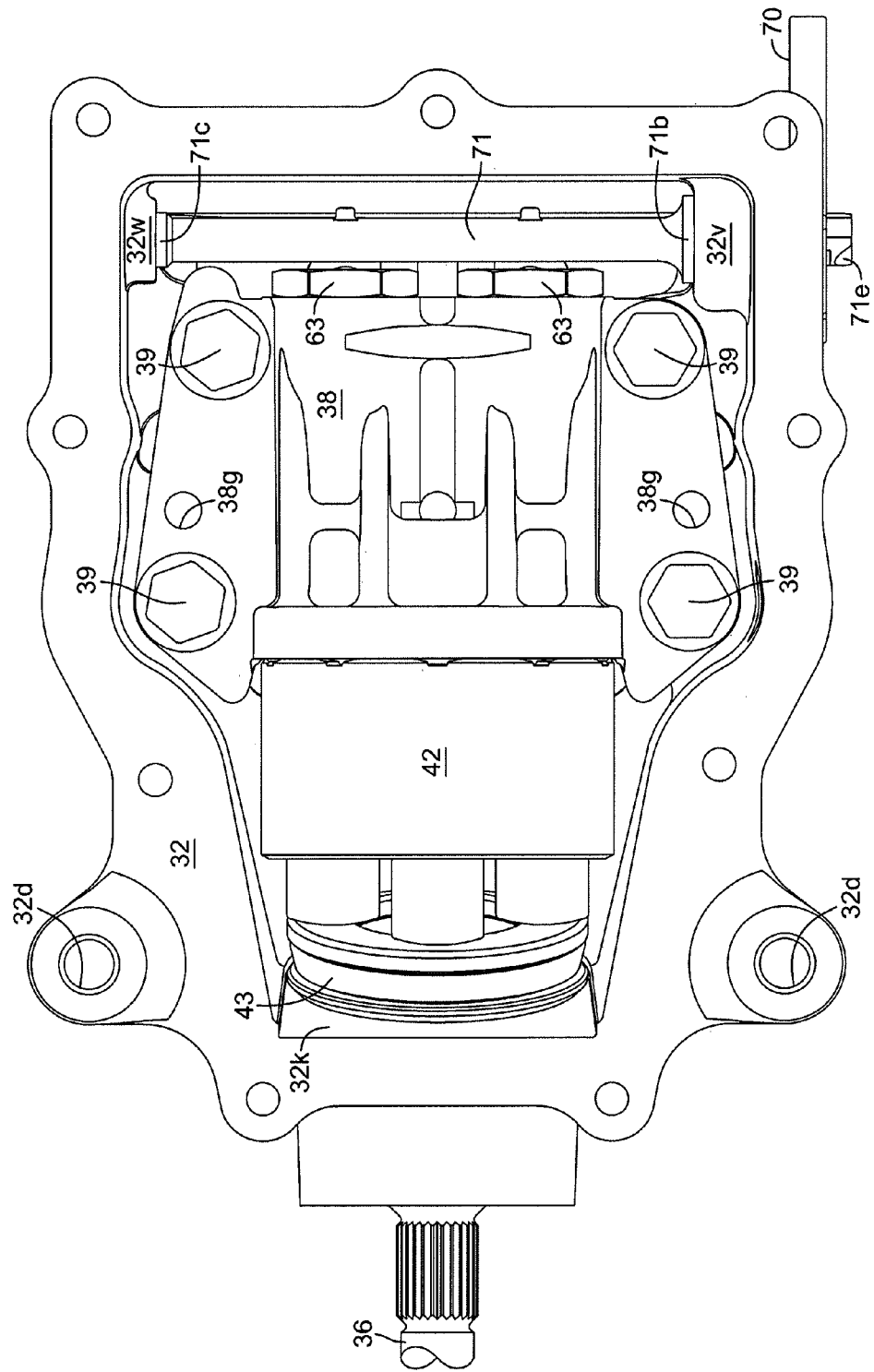
FIG. 13 is a bottom plan view of the transmission assembly of FIG. 1 with the housing cover plate removed.

As shown in FIGS. 1, 3 and 13, the bypass shaft 71 also comprises integrally formed bearing surfaces 71b and 71c that are supported, respectively, in an opening and a recess formed in shaft supports 32v and 32w that are formed on opposing sides of main housing 32. A seal abutment flange 71d formed on bypass shaft 71 ensures limited outward movement along the rotational axis of bypass shaft 71 because of its location adjacent to the bypass shaft seal 72.

Figure 17:
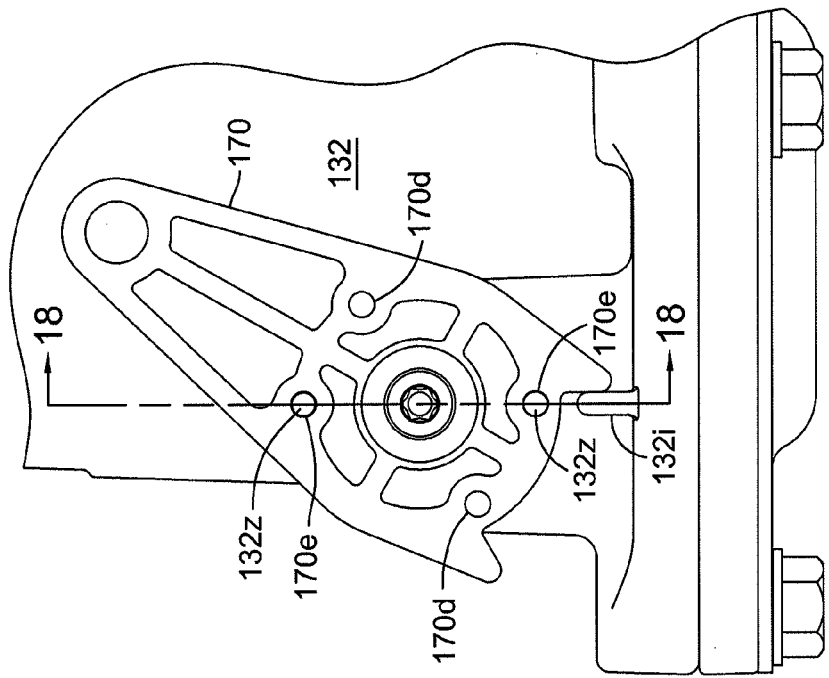
FIG. 17 is a side plan view identical to FIG. 16, except with the bypass mechanism engaged.
Figure 16:
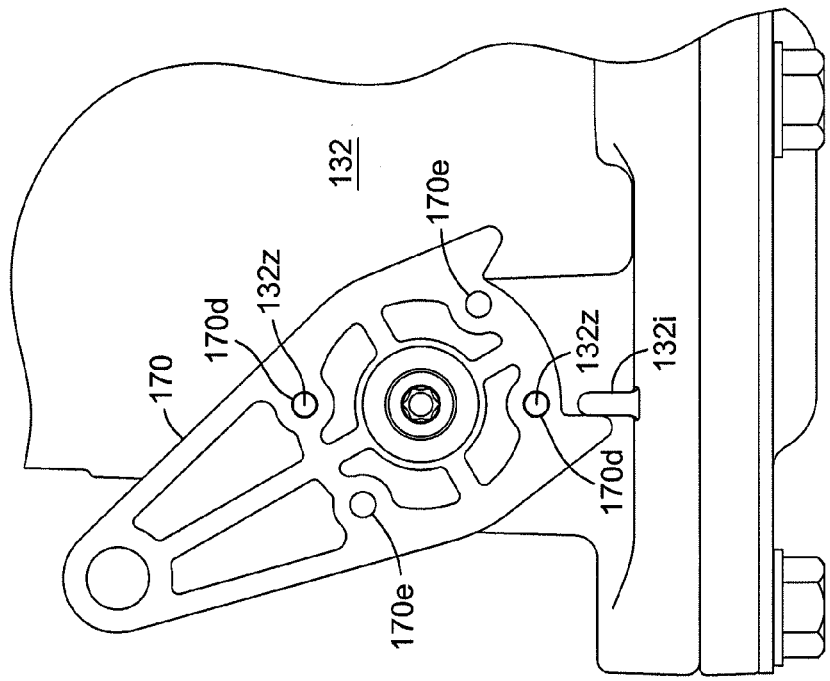
FIG. 16 is a side plan view of a portion of an alternative bypass arm mechanism.
Figure 18:
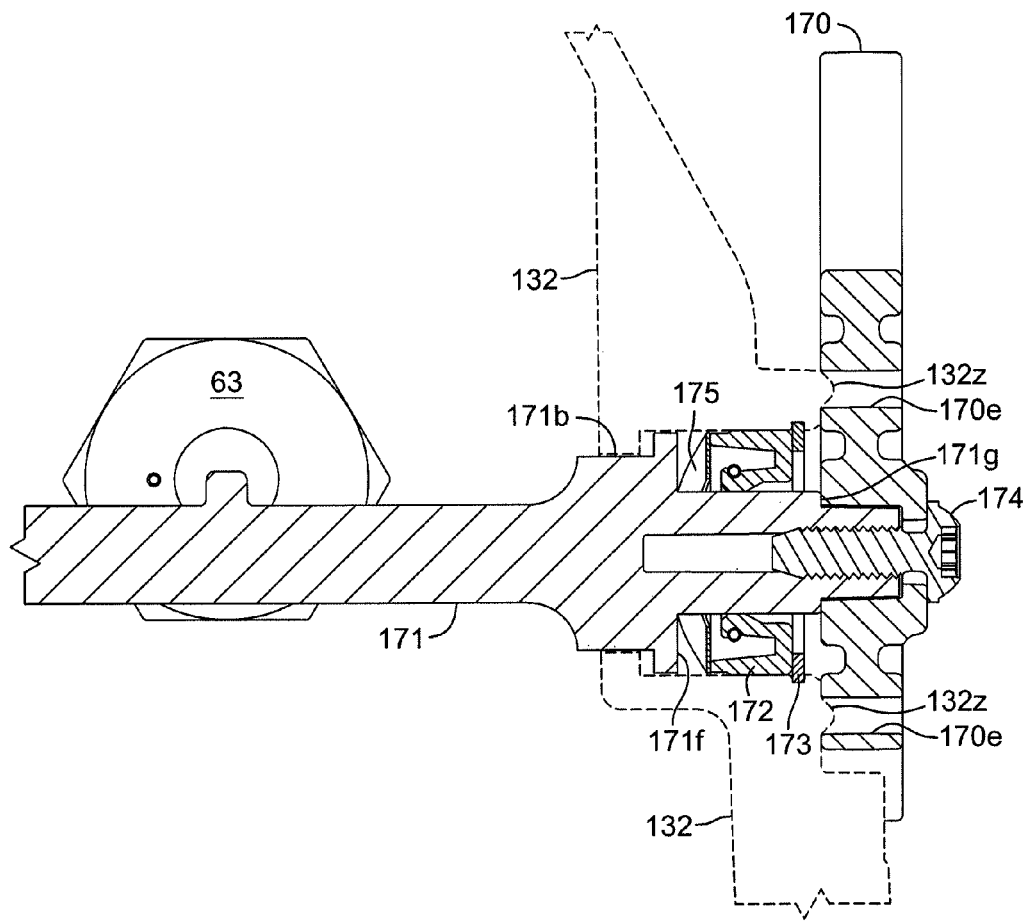
FIG. 18 is a cross-sectional view of the bypass arm mechanism taken along line 18-18 of FIG. 17 with the housing shown in phantom.

FIGS. 16, 17, and 18 show a portion of an alternative embodiment of the bypass arm mechanism. Bypass arm 170, which can be composed of a plastic material, has two pairs of detent openings, 170d and 170e, which mate with and alternately engage detents 132z. When bypass arm 170 is positioned in a first detent position as shown in FIG. 16, detents 132z engage detent openings 170d. When bypass arm 170 is manipulated by pivoting bypass arm 170 to a second detent position as shown in FIG. 17, detents 132z engage detent openings 170e. Protrusion 132i stops the pivoting of bypass arm 170 when the second detent position is reached.

Referring to FIG. 18, manipulating bypass arm 170 causes bypass shaft 171 to rotate because bypass arm 170 is fixed to bypass shaft 171 by fastener 174. Shoulder 171g contacts bypass arm 170 to position same. Wave spring 175 bears against flange 171f and bypass shaft seal 172, which are all retained by retaining ring 173. The force of wave spring 175 against flange 171f and seating of detents 132z in the pairs of detent openings 170d and 170e provides resistance of bypass shaft 171 to rotation. Bypass shaft 171 is partially supported by contact of bearing surface 171b with main housing 132. Bypass shaft 171 is also partially supported by contact with main housing 132 of a bearing surface (not shown) of bypass shaft 171 corresponding to bearing surface 71c of bypass shaft 71.

Figure 7:
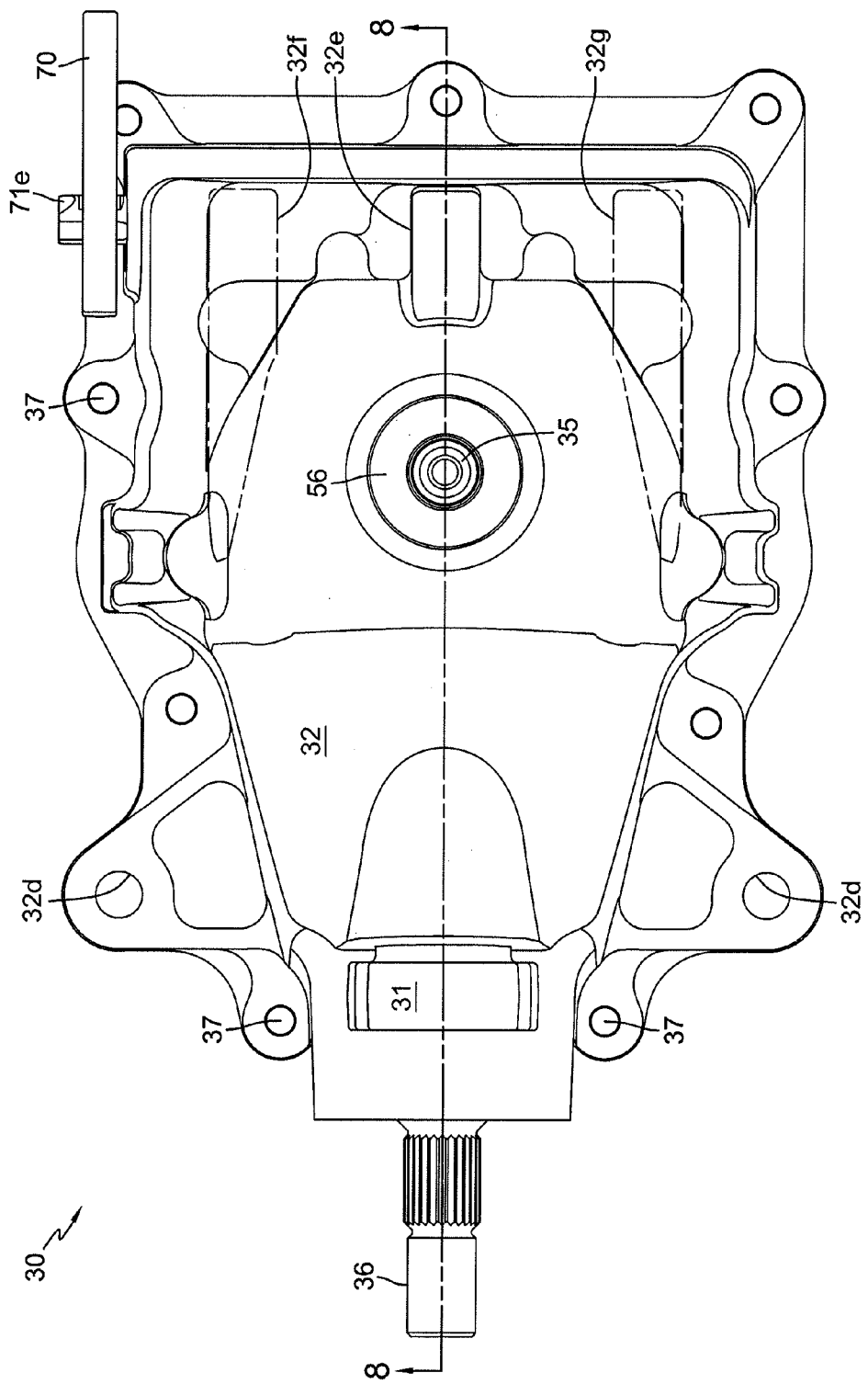
FIG. 7 is a top plan view of the transmission assembly of FIG. 2 with alternative or additional structure shown in phantom.

As can be seen most clearly in FIGS. 7 and 8, the rotational axis 35Ax of input shaft 35, the rotational axis 36Ax of output shaft 36, and the rotational axis 45Ax of trunnion shaft 45a that is integrally formed as part of swash plate 45 all lie on a single vertical plane with one end of both the input shall 35 and output shaft 36 supported in center section 38 and the opposite end supported in main housing 32. The components of the hydraulic circuit are all arranged symmetrically about the plane on which these three axes are located, resulting in a substantially symmetrical main housing 32 and transmission assembly 30. With a few obvious and relatively minor modifications, transmission assembly 30 can be configured symmetrically in its entirety about the vertical plane represented by line 8-8 of FIG. 7. It will be understood that this plane need not be vertical with respect to ground as transmission assembly 30 may be mounted in different configurations such as is shown in vehicle 10 of FIG. 14, where the plane would be horizontal with respect to ground, as compared to vehicle 80 of FIG. 15 where the plane would be vertical.

Referring primarily to FIGS. 7, 8, 10, 11 and 12, vertical input shaft 35 passes through opening 32n of main housing 32 and is supported by a bearing 58 and by a journal opening 38c formed in center section 38. Vertical input shaft 35 is drivingly engaged to the axial piston pump assembly 40 that is rotatably disposed on pump running surface 38a of center section 38. The horizontal output shaft 36 passes through opening 32p of housing 32 and is supported by a bearing 59 and by a journal opening 38d formed in center section 38. Horizontal output shaft 36 is drivingly engaged to the axial piston motor assembly 42 that is rotatably disposed on motor running surface 38b of center section 38. Vertical input shaft 35 is restrained from excessive axial movement in one direction by shoulder 35a formed on shaft 35 and in the opposite direction by center section 38 thrust surface 38m. In this manner, input shaft 35 is trapped in position during assembly without using additional parts, such as retaining rings, for example. Similarly, output shaft 36 is restrained from excessive axial movement in one direction by shoulder 36a formed on shaft 35 and in the opposite direction by a simple wire retaining ring 65 or other similar retaining ring.

Referring primarily to FIGS. 8 and 10-13, center section 38 includes hydraulic porting and passages for hydraulically connecting pump assembly 40 and motor assembly 42. Pump running surface 38a comprises two kidney-shaped hydraulic fluid ports 38e and motor running surface 38b comprises two kidney-shaped hydraulic fluid ports 38f. Two check plug ports 38k are provided in the ends of the two substantially parallel fluid passage tubes 38j to receive the two check plug assemblies 63. The fluid passage tubes 38j provide fluid communication between pump running surface 38a and motor running surface 38b.

Precision installation or center section 38 is accomplished by employing a combination of design elements and installation techniques. Assembly tools (not shown) comprising pin locators (not shown) accurately position the center section 38 in main housing 32 by simultaneously engaging two machined openings 38g formed in center section 38 and two axially aligned machined recesses 32q formed in main housing 32 while installing four center section attachment screws 39 through four machined openings 38p formed in center section 38 and into engagement with four machined recesses 32t formed in main housing 32. Machined surfaces 38n formed on two alignment protrusions 38i integrally formed on center section 38 interface with two machined vertical surfaces 32s formed in main housing 32 to further ensure proper alignment of center section 38. Finally, four machined mounting boss faces 38h formed on center section 38 interface with four machined mounting boss faces 32r formed on main housing 32, with these machined mounting boss faces all located on a single horizontal plane at installation to help ensure component machining and mating accuracy. This combination of design elements and installation techniques for aligning and installing center section 38 allows screws 39 to be self-tapping screws (i.e. thread-cutting or thread-forming screws), thereby eliminating a tapping procedure from the machining requirements that are employed to manufacture the four machined recesses 32t formed in main housing 32. This combination of design elements and installation techniques does not, however, preclude pre-tapping of machined recesses 32t. Center section 38 and housing 32 are generally symmetrical about a plane passing through the longitudinal axis of rotation of output shaft 36, as seen most clearly in FIG. 13, resulting in a more compact unit.

Figure 2:
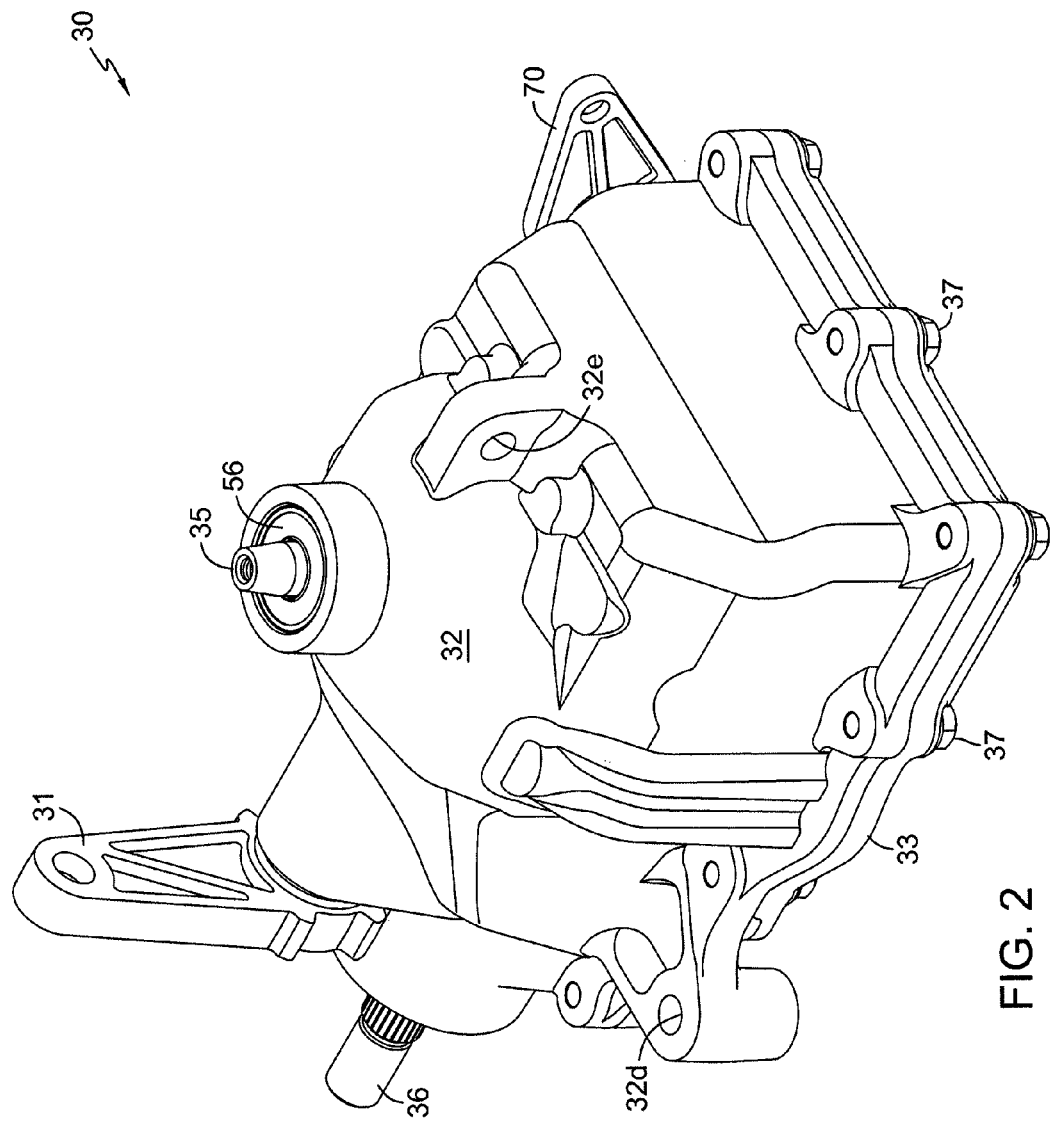
FIG. 2 is a perspective view of the transmission assembly of FIG. 1 rotated 180 degrees about the input shaft axis and with the fan and pulley assembly removed from the input shaft.

Referring primarily to FIGS. 1 and 2, a pulley and fan assembly 44 may be secured to the input shaft 15 of transmission assembly 30, as shown, to accept a drive belt and provide air flow to cool transmission assembly 30 when it is belt-driven. Alternatively, transmission assembly 30 may be driven directly by coupling a prime mover output shaft (not shown) or other drive shaft (no shown) to input shaft 35, or cooled by other means, such as a separate fan (not shown), when cooling is required. Modification of input shaft 35 may be required to accommodate direct coupling. Various shaft coupling methods are well known and will not be described in detail herein.

Referring primarily to FIGS. 1, 2 and 7, two mounting bosses 32d with hole centerlines located on a single vertical plane at a first end of transmission assembly 30, and at least one mounting lug 32e with a hole centerline located on a horizontal plane at an opposing end of transmission assembly 30, are provided to secure transmission assembly 30 to a vehicle or equipment frame structure. As shown in FIG. 7, alternatively positioned or additional lugs, such as lug 32f and lug 32g, both of which are illustrated using phantom lines, may be provided for additional mounting support or ease of installation of transmission assembly 30. Alternatively, mounting lugs 32d, 32e, 32f, and 32g may be omitted and a plurality of screws 37 replaced with studs (not shown) to attach transmission assembly 30 to a mounting plate of a vehicle (not shown).

Figure 14:
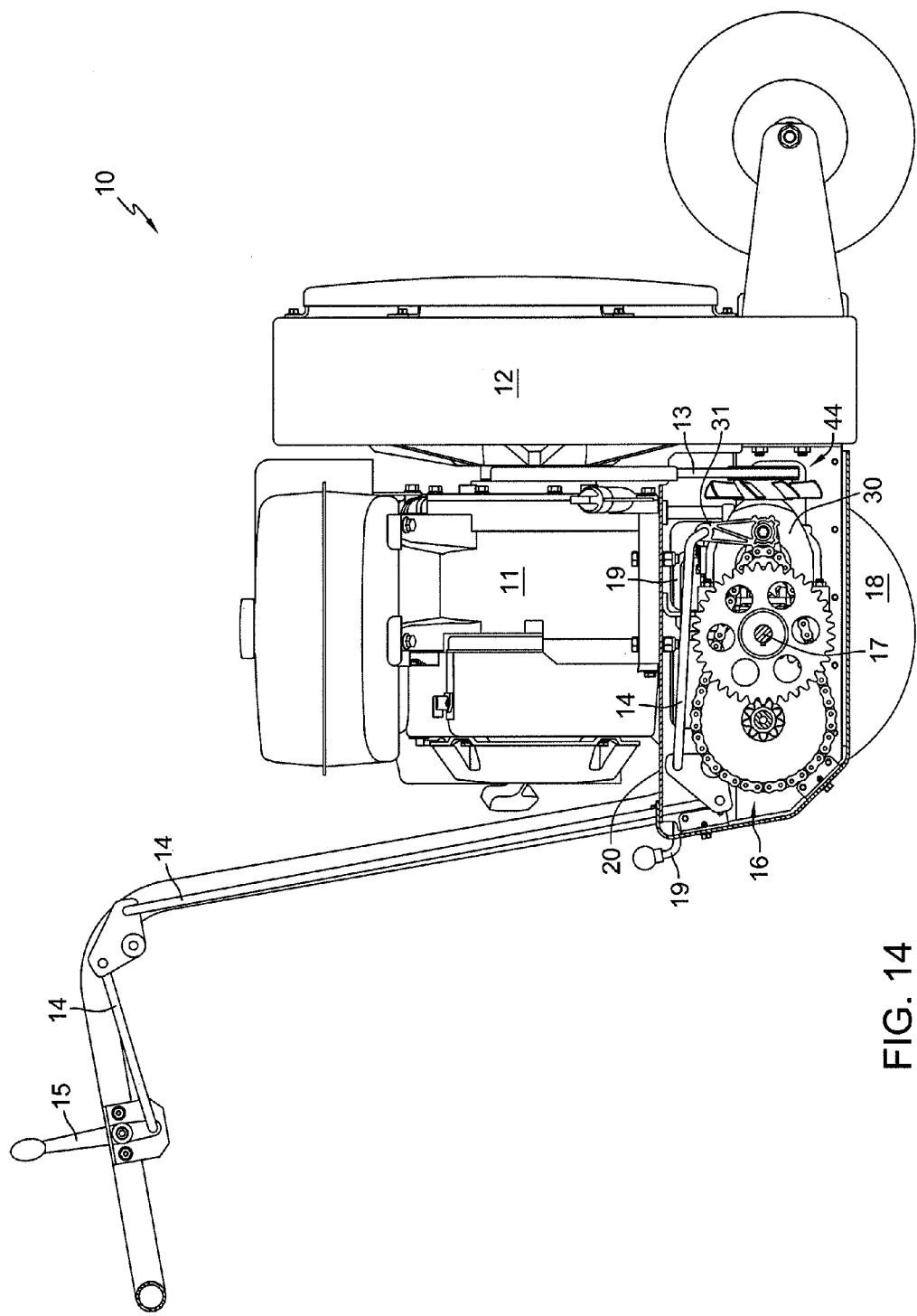
FIG. 14 is a side elevational view of a walk-behind leaf blowing machine with a portion of the frame cut away and one wheel removed for clarity, the leaf blowing machine incorporating the transmission assembly of FIG. 1 with an alternative mounting lug location as illustrated in FIG. 7.

As illustrated in FIG. 14, an exemplary wheeled leaf blowing machine or vehicle 10 comprises a prime mover 11 that drives a blower assembly 12 and a transmission drive belt 13 that engages pulley and fan assembly 44 to drive transmission assembly 30. The speed and rotation direction of output shaft 36 of transmission assembly 30, and therefore, the speed and direction of vehicle 10, is controlled by the operator of vehicle 10. Linkage assembly 14 connects an operator control lever 15 to the control arm 31 of transmission assembly 30. Output shaft 36 is drivingly engaged to a reduction gear set or gear train 16 which may include a roller chain, sprockets and gears, as shown, to drive an axle 17 that drives a pair of wheels 18. A bypass linkage 19 is provided to allow the operator to effectively disconnect the hydraulic fluid circuit in order to move vehicle 10 without the resistance associated with hydraulically driving the transmission. In this vehicle embodiment, prime mover 11, blower assembly 12, transmission assembly 30 and axle 17 are all securely attached to or mounted on a vehicle frame 20. As is well known, configurations of operator controls, control linkages, reduction gear sets or gear trains, vehicle frames, etc., can vary widely among vehicle and equipment configurations and manufacturers.

Figure 15:
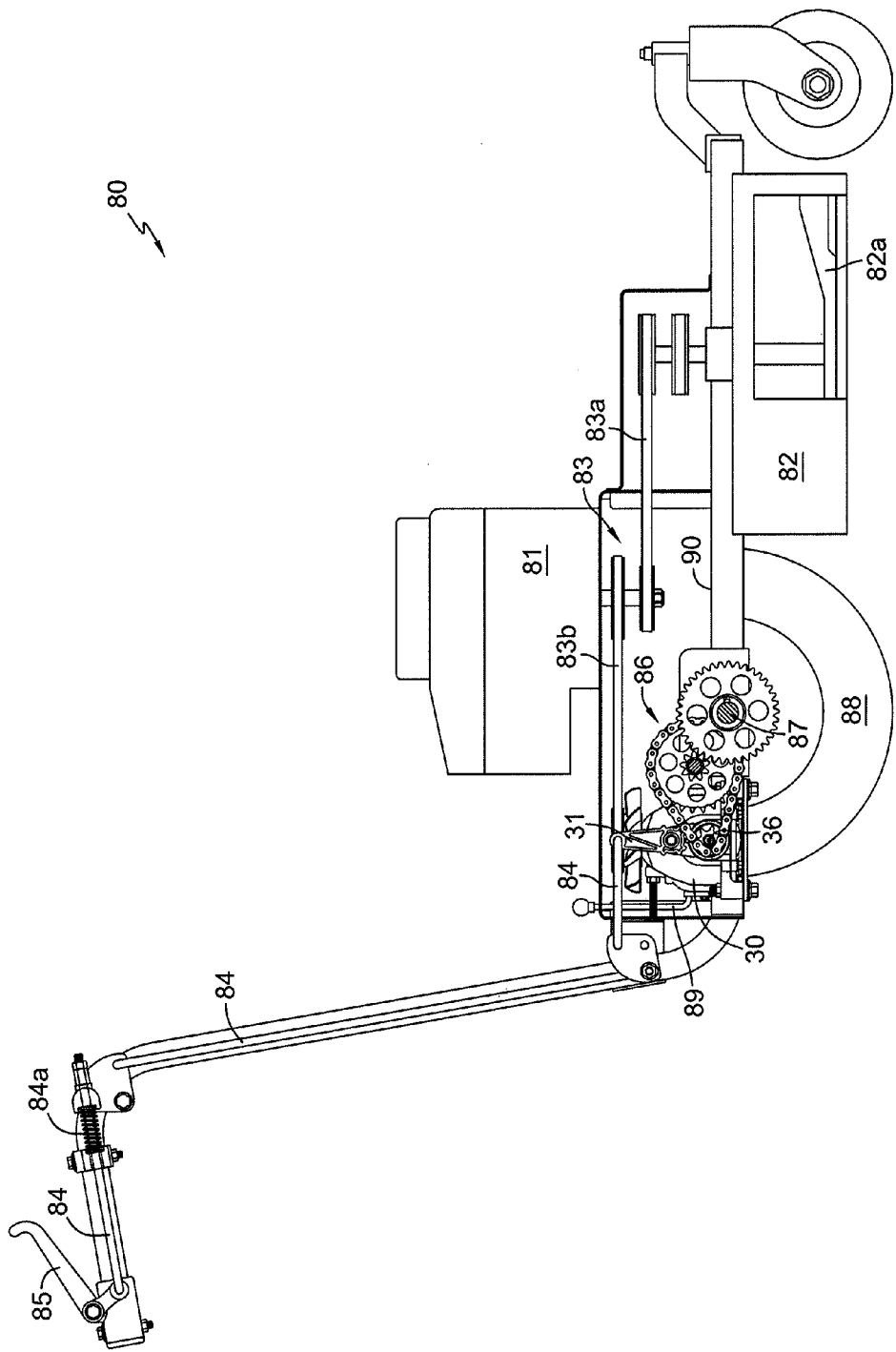
FIG. 15 is a side elevational view or a walk-behind mowing machine with a portion of the frame cut away and one wheel removed for clarity, the mowing machine incorporating the transmission assembly of FIG. 1 with an alternative mounting lug location as illustrated in FIG. 7.

As illustrated in FIG. 15, an exemplary mowing machine or vehicle 80 comprises a prime mover 81 that indirectly drives one or more blades 82a of mowing deck assembly 82 and also indirectly drives transmission assembly 30 by means of a pulley and belt system 83 comprising deck drive belt 83a and transmission drive belt 83b, respectively. A clutch or other known mechanism (not shown) may be used to selectively engage and disengage the blade(s) 82a of mowing deck assembly 82. As in the exemplary leaf blowing machine described previously herein, the speed and rotation direction of output shaft 36 of transmission assembly 30, and therefore, the speed and direction of vehicle 80, is controlled by the operator of vehicle 80. Linkage assembly 84 connects an operator control lever 85 to the control arm 31 of transmission assembly 30. A spring-operated return-to-neutral (RTN) mechanism 84a may be provided as part of linkage assembly 84 to return the control arm 31 of transmission assembly 30 to a neutral position when the operator releases lever 85. Output shaft 36 of transmission assembly 30 is drivingly engaged to a reduction gear set or gear train 86 which may include a roller chain, sprockets and gears, as shown, to drive axle 87 that drives a pair of wheels 88. A bypass linkage 89 is provided to allow the operator to conveniently bypass (or effectively disconnect) the hydraulic fluid circuit in order to move vehicle 80 without the resistance associated with hydraulically driving the transmission. In this vehicle embodiment, prime mover 81, transmission assembly 30 and axle 87 are all securely attached to or mounted on a vehicle frame 90. As mentioned previously herein, configurations of operator controls, control linkages, reduction gear sets or gear trains, vehicle frames, etc., can vary widely among vehicle and equipment configurations and manufacturers.

It will be understood that RTN mechanism 84a can be omitted and an alternate RTN mechanism (not shown) that includes a control arm (not shown) mounted on a transmission assembly that can be very similar in form to transmission assembly 30 (with relatively minor modifications to housing 32) may be used to return the transmission to a neutral position when the operator releases lever 85. An example of an RTN mechanism (including control arm) of this type is described in commonly-owned U.S. Pat. No. 6,968,687, the terms of which are incorporated herein by reference.

It will also be understood that the pulley and belt system can be omitted either partially or entirely and a transmission assembly 30 or transmission assembly very similar to transmission assembly 30 (with input shaft modification as needed) can be driven directly by the prime mover or a shaft driven by the prime mover. A mowing deck, for example, or other implement or apparatus, can also be driven by a shaft driven by the prime mover. Prime mover 11 or prime mover 81 could be an internal combustion engine, electric motor or the like.

Additional controls (not shown) may be provided to control the start-up and speed of prime mover 11 or prime mover 81, or a prime mover in an alternative embodiment (as described herein, but not shown), control a power take-off device (not shown) or control other functions of vehicles, machines or apparatuses to which transmission assembly 30 is applied.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

We claim:

1. A hydraulic drive device, comprising:
   a housing forming an internal sump;
   a pump running surface disposed in the housing;
   a pump cylinder block rotatably disposed on the pump running surface and having a plurality of pump pistons disposed therein, the pump cylinder block having a first axis of rotation;
   a thrust bearing engaged to the plurality of pump pistons; and
   a swash plate disposed in the housing and comprising a main body having a second axis of rotation, a trunnion shaft integrally formed on one end of the main body along the second axis of rotation and a first structural rib and a second structural rib formed on a first surface of the main body opposite a second surface in contact with the thrust bearing, each structural rib extending the length of the first surface in a direction generally parallel to the second axis of rotation;

the housing having a pair of thrust ribs formed on an inner surface thereof, one of the thrust ribs being located adjacent to a first cam-like surface formed on one end of the first structural rib and a second thrust rib being located adjacent to a second cam-like surface formed on one end of the second structural rib, where the pair of thrust ribs are located so that only one thrust rib can be in contact with its respective cam-like surface at a time, and the thrust ribs permit arcuate rotation of the swash plate while limiting movement of the swash plate in an axial direction parallel to the second axis of rotation.

2. The hydraulic drive device of claim 1, wherein the swash plate further comprises a trunnion protrusion extending from the main body on the opposite side from the trunnion shaft.

3. The hydraulic drive device of claim 2, further comprising a pair of cradle bearings disposed in the housing, wherein one of the cradle bearings engages the trunnion shaft and the other cradle bearing engages the trunnion protrusion.

4. The hydraulic drive device of claim 1, further comprising a pair of skirting ribs formed on the main body of the swash plate, wherein the pair of skirting ribs extend on opposite sides of the swash plate generally perpendicular to the first structural rib and the second structural rib.

5. The hydraulic drive device of claim 1, further comprising a pair of cradle bearings disposed in the housing, each cradle bearing comprising a pair of locator pins that engage corresponding pin receptacles formed in the housing to locale the cradle bearing.

6. The hydraulic drive device of claim 1, further comprising:

a center section disposed in the internal sump, wherein the pump running surface is formed on the center section and the center section further comprises a motor running surface; and a hydraulic motor disposed on the motor running surface and comprising a motor cylinder block driven by a motor shaft having a third axis of rotation, wherein the first axis of rotation, the second axis of rotation and the third axis of rotation all lie in a single plane.

7. The hydraulic drive device of claim 6, wherein the swash plate is symmetrical about the single plane.

8. A hydraulic drive device, comprising:

a hydraulic pump connected to a hydraulic motor through a porting system;

a swash plate positioned to vary the output of the hydraulic pump and being movable in an arcuate manner along a first axis of rotation; and a trunnion shaft having a proximal end connected to the swash plate and a distal end connected to a separate control arm, whereby rotation of the control arm causes arcuate motion of the swash plate to vary the output of the hydraulic pump;

the distal end of the trunnion shaft having a plurality of tapered recesses formed thereon and spaced along the circumference of the trunnion shaft, each recess extending a distance along the trunnion shaft from the distal end;

the control arm having a plurality of tapered ribs shaped to engage the plurality of tapered recesses on the trunnion shaft, each tapered rib fitting into one of the plurality of tapered recesses when the control arm is attached to the trunnion shaft.

9. The hydraulic drive device of claim 8, wherein each tapered recess has a triangular shape.

10. The hydraulic drive device of claim 8, further comprising a housing forming a sump wherein the hydraulic pump is disposed in the sump, wherein the swash plate comprises a main body, and a first structural rib and a second structural rib formed on a first surface of the main body opposite a second surface in contact with a thrust bearing, each structural rib extending the length of the first surface in a direction parallel to the first axis of rotation; and the housing comprises a pair of thrust ribs formed on an inner surface thereof, one of the thrust ribs being located adjacent to a first cam-like surface formed on one end of the first structural rib and a second thrust rib being located adjacent to a second cam-like surface formed on one end of the second structural rib, where the pair of thrust ribs are located so that only one thrust rib can be in contact with its respective cam-like surface at a time, and the thrust ribs permit arcuate rotation of the swash plate while limiting movement of the swash plate in an axial direction parallel to the first axis of rotation.

11. The hydraulic drive device of claim 10, wherein the swash plate further comprises a trunnion protrusion extending from the main body on the opposite side from the trunnion shaft.

12. The hydraulic drive device of claim 11, further comprising a pair of cradle bearings disposed in the housing, wherein one of the cradle bearings engages the trunnion shaft and the other cradle bearing engages the trunnion protrusion.

13. The hydraulic drive device of claim 12, further comprising a pair of skirting ribs formed on the main body of the swash plate, wherein the pair of skirting ribs extend in a direction generally perpendicular to the first structural rib and the second structural rib.

14. The hydraulic drive device of claim 8, further comprising a main housing joined to a housing cover plate to form an internal sump.

15. The hydraulic drive device of claim 8, further comprising:

a housing forming an internal sump;

a center section disposed in the internal sump, wherein the porting system is formed in the center section; and a pump running surface and a motor running surface formed on the center section, wherein the hydraulic pump is disposed on the pump running surface and comprises a pump cylinder block and a pump input shaft having a second axis of rotation, and the hydraulic motor is disposed on the motor running surface and comprises a motor cylinder block and a motor shaft having a third axis of rotation, wherein the first axis of rotation, the second axis of rotation and the third axis of rotation all lie in a single plane.

16. The hydraulic drive device of claim 15, wherein the swash plate is symmetrical about the single plane.

17. A hydraulic drive device, comprising:

a housing forming an internal sump;

a center section mounted in the internal sump and having a first running surface located on a first surface of the center section, a second running surface located on a second surface of the center section, a hydraulic porting system disposed therein to hydraulically connect the first running surface to the second running surface, and a pair of ports formed in a second side of the center section opposite a first side to hydraulically connect the hydraulic porting system to the internal sump;

a hydraulic pump rotatably disposed on the first running surface and a hydraulic motor disposed on the second running surface;

a pair of check plugs disposed in the pair of ports and connected to hydraulic porting formed in the center section, each check plug having a closed position and an open position, whereby the pair of check plugs permit fluid flow from the hydraulic porting to the internal sump when in the open position; and a rotary bypass mechanism comprising:

a shaft disposed in the housing and having a longitudinal axis;

a pair of engagement fingers located along the longitudinal axis of the shaft, each of the pair of engagement fingers being located adjacent to one of the pair of check plugs, and a bypass arm engaged to one end of the shaft and disposed external to the housing, the bypass arm capable of rotating the shaft along the longitudinal axis between a first position where each of the pair of engagement fingers is not in contact with a respective one of the pair of check plugs, and a second position where each of the pair of engagement fingers is in contact with the respective one of the pair of check plugs to cause each of the pair of check plugs to move to the open position;

the housing comprising a pair of detents formed on an external surface thereof and the bypass arm comprising a first pair of detent openings that engage the pair of detents when the bypass arm is in the first position to frictionally retain the bypass arm in the first position and a second pair of detent openings located to engage the pair of detents when the bypass arm is in the second position to functionally retain the bypass arm in the second position.

18. The hydraulic drive device of claim 17, wherein the hydraulic pump has a first axis of relation and the hydraulic motor has a second axis of rotation generally perpendicular to the first axis of rotation, and the pair of detents are formed in the housing along a line that is generally parallel to the first axis of rotation.

19. The hydraulic drive device of claim 17, further comprising a projection formed on the housing adjacent the bypass arm, wherein the projection contacts a first surface of the bypass arm when the bypass arm is in the first position to limit rotation of the bypass arm towards the first position and the projection contacts a second surface of the bypass arm when the bypass arm is in the second position to limit rotation of the bypass arm towards the second position.

20. A walk-behind vehicle for control by a vehicle operator, comprising:

a frame having a prime mover disposed thereon;

an axle for driving at least one wheel of the vehicle, the axle having a first axis of rotation;

a transmission housing mounted to the frame and forming an internal sump;

a hydraulic pump and a hydraulic motor disposed in the internal sump;

a swash plate disposed in the transmission housing and engaged to the hydraulic pump for varying the output thereof, a trunnion shaft having a first end engaged to one side of the swash plate and a second end disposed outride the transmission housing;

a control arm disposed on the second end of the trunnion shaft for rotating the trunnion shaft about a second axis of rotation;

an input shaft driven by the prime mover and rotatable about a third axis of rotation, the input shaft extending into the transmission housing and driving the hydraulic pump: and an output shaft extending from the transmission housing and engaged to and driving the axle, the output shaft driven by the hydraulic motor and rotatable about a fourth axis of rotation;

wherein the second axis of rotation, the third axis of rotation and the fourth axis of rotation are all disposed in a single plane and the single plane is parallel to the first axis of rotation.

21. The vehicle of claim 20, further comprising a reduction gear train driven by the output shaft, whereby rotational force of the hydraulic motor is transferred to the axle through the reduction gear train.

22. The vehicle of claim 21, wherein the single plane is disposed closer to the rear of the vehicle than is the axle.

* * * * *

UNITED STATES PATENT AND TRADEMARK OFFICE
CERTIFICATE OF CORRECTION

| | |
|---|---|
| PATENT NO. | : 8,984,871 B1 |
| APPLICATION NO. | : 13/336321 |
| DATED | : March 24, 2015 |
| INVENTOR(S) | : Jesse L. Probst et al. |

It is certified that error appears in the above-identified patent and that said Letters Patent is hereby corrected as shown below:

Specification

Column 1, line 5, "implication" should be changed to --application--.
Column 1, line 23, "bettor" should be changed to --better--.
Column 2, line 1, "or" should be changed to --of--.
Column 4, line 58, "wilt" should be changed to --will--.
Column 5, line 46, "slow" should be changed to --show--.
Column 6, line 17, "arcurately" should be changed to --arcuately--.
Column 7, line 55, "shall" should be changed to --shaft--.
Column 8, line 36, "or" should be changed to --of--.
Column 8, line 43, "installing four" should be changed to --installing the four--.
Column 9, line 2, "15" should be changed to --35--.
Column 9, line 7, "no" should be changed to --not--.

Claims

Column 11, line 30, claim 30, "locale" should be changed to --locate--.
Column 13, line 34, claim 6, "relation" should be changed to --rotation--.
Column 14, line 18, claim 20, "outride" should be changed to --outside--.
Column 14, line 26, claim 20, ":" should be changed to --;--.

Signed and Sealed this
Sixth Day of October, 2015

Michelle K. Lee
*Director of the United States Patent and Trademark Office*